United States Patent
Mori et al.

(10) Patent No.: US 7,666,097 B2
(45) Date of Patent: Feb. 23, 2010

(54) METHOD FOR GENERATING IMAGE ANIMATION EFFECT

(75) Inventors: Tomohiro Mori, Nerima-ku (JP); Takahiro Fukuda, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 276 days.

(21) Appl. No.: 10/803,038

(22) Filed: Mar. 18, 2004

(65) Prior Publication Data

US 2004/0259615 A1 Dec. 23, 2004

(30) Foreign Application Priority Data

Mar. 31, 2003 (JP) .............................. 2003-093193

(51) Int. Cl.
*A63F 13/00* (2006.01)
(52) U.S. Cl. .......................................... 463/31; 463/32
(58) Field of Classification Search ................ 345/418, 345/419, 581, 589, 592, 423, 427, 474; 463/3, 463/7, 8, 1, 30–33
See application file for complete search history.

(56) References Cited

U.S. PATENT DOCUMENTS 6,211,882 B1 * 4/2001 Pearce et al. ................. 345/419
6,623,358 B2 * 9/2003 Harima ......................... 463/31
6,847,364 B1 * 1/2005 Dichter ....................... 345/473

FOREIGN PATENT DOCUMENTS

| JP | A 7-328228 | 12/1995 |
|----|------------|---------|
| JP | B2 3059956 | 4/2000 |

OTHER PUBLICATIONS

Picture from Street Fighter Alpha 3. Dated: Jan. 13, 1999. <URL: http://www.gamespot.com/pages/image_viewer/frame_lead.php-?pid=198819&img=10>.*
Finney Merrill, "M. Bison as and Versus" Dated: Jul. 31, 2000 <URL: http://www.gamefaqs.com/console/psx/file/564869/323>.*
Majugarzett "Street fighter alpha 3—arcade mode with akuma" <URL: http://www.youtube.com/watch?v=WEFUBAj1aEE> Time Frames 11:58 to 12:00 and 12:09 to 12:12.*
Star Trek: TNG—"We'll Always Have Paris" Dated: May 2, 1988 <URL: http://www.youtube.com/watch?v=tP242qOgFLw>.*
"After Effects Magic No. 5, Using a Blur to Create a Powerful Scene"; Graphics World, vol. 2 No. 9, IDG Communications, Inc., pp. 121-122; Sep. 1, 1999).

* cited by examiner

*Primary Examiner*—John M Hotaling
(74) *Attorney, Agent, or Firm*—Oliff & Berridge PLC

(57) ABSTRACT

A method for generating an image in a virtual space seen from a predetermined viewpoint, has: judging whether to start a motion of a first object placed in the virtual space; if it is judged to start the motion of the first object, automatically controlling the motion of the first object in a predetermined moving direction; if it is judged to start the motion of the first object, locating a plurality of effect objects at a front side in the moving direction from a location of the first object; and making the plurality of effect objects sequentially not displayed in proximate order from the location of the first object at time that it is judged to start the motion of the first object.

10 Claims, 16 Drawing Sheets

HEAD PART

ABDOMINAL PART

FOOT PART

RIGHT

FRONT

BACK

LEFT

FIG.10

Effect object information 740

| EFFECT OBJECT INFORMATION | | 740a |
|---|---|---|
| CHARACTER ID | FIGHTER 01 | 740b |
| DETERMINED PART | 1(HEAD PART) | 740c |
| HIT DIRECTION | 1(FRONT) | |

| FIRST EFFECT Obj | APPEARANCE IMAGE (740d) | POSITIONAL INFORMATION (740e) | MODEL DATA (740f) |
|---|---|---|---|
| B1 (T1) | 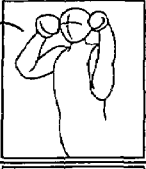 | $(X_1, Y_1, Z_1)$ $(\theta_1, \theta_1, \theta_1)$ | model-111a |
| B2 (T2) |  | $(X_2, Y_2, Z_2)$ $(\theta_2, \theta_2, \theta_2)$ | model-111a |
| B3 (T3) |  | $(X_3, Y_3, Z_3)$ $(\theta_3, \theta_3, \theta_3)$ | model-111a |
| B4 (T4) | 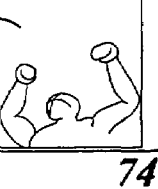 | $(X_4, Y_4, Z_4)$ $(\theta_4, \theta_4, \theta_4)$ | model-111a |

| FIRST EFFECT Obj | APPEARANCE IMAGE (740d) | POSITIONAL INFORMATION (740e) | MODEL DATA (740f) |
|---|---|---|---|
| C1 (U1) |  | $(X_5, Y_5, Z_5)$ $(\theta_5, \theta_5, \theta_5)$ | model-111b |
| C2 (U2) | 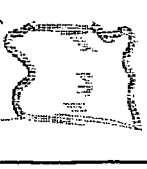 | $(X_6, Y_6, Z_6)$ $(\theta_6, \theta_6, \theta_6)$ | model-111b |

METHOD FOR GENERATING IMAGE ANIMATION EFFECT

BACKGROUND OF THE INVENTION

1. Field of the Invention

The present invention relates to a method for generating an image, an information storage medium, an image generation device, a data signal and a program for making a computer device execute judging whether to start a motion of an object positioned in a virtual space, automatically controlling the motion of the object in a predetermined moving direction if it is judged to start the motion of the object, and generating an image in the virtual space as seen from a predetermined viewpoint.

2. Description of Related Art

For example, in a video game, a CG movie or the like where an appearance in a virtual space is expressed by a CG (Computer Graphics) image seen from a predetermined viewpoint by controlling a motion of an object positioned in the virtual space, an image effect process for more effectively expressing the appearance of the object moving is applied on the CG image.

"blur effect" is a well-known effect. The blur effect is a process to display an effect corresponding to a blur or after-image of an object, along a path where the object moves. By the blur effect, it is possible to provide a viewer the impression that the object is moving at high speed.

As a method to achieve the blur effect, for example, known is one for determining a displaying position in an opposite direction (at a rearward) to a moving direction of a character (object), positioning a plurality of after-image data having the identical shape as the character, and synthesizing the data so as to make image data of a background see-through (see, for example, Japanese Patent Application Publication (Unexamined) No. Tokukai-Hei 7-328228).

As another method, known is one for positioning N (N is a natural number) polygons of a character in an opposite side to a moving direction of the character, and generating images for the N polygons by setting N different colors and N different brightness levels (see, for example, Japanese Patent 3059956; corresponding to all the claims).

By the way, for dramatizing and expressing, there is a request for effectively expressing not only an object already moving but also a momentum (start-dash) of the motion start of the object. However, there has been no art disclosing a way of effectively expressing the momentum at the motion start.

In the conventional image effect represented by the blur effect according to the moving object, expression of the effect is added to an opposite side (rearward) to the moving direction of the object. Therefore, there is a problem that it is not possible to obtain a desired result when the effect is applied to the object which is about to start moving. In addition, as a method to express the momentum of the motion start, known is a comic-like expression where the object itself is deformed in an opposite direction to a moving direction of the object as if power were being charged by compressing a spring. Similarly, an expression method of having a description such as injection indicating a propulsive force of the motion or the like, at rearward of the object. However, there is a problem that it is not possible to apply the same method in a case where another object crashes into the object, or the like.

SUMMARY OF THE INVENTION

In view of the above-mentioned problems, an object of the present invention is to achieve a new image effect having superior versatility for expressing the momentum of the object at its motion start.

In accordance with a first aspect of the present invention, a method for generating an image in a virtual space seen from a predetermined viewpoint, comprises: judging whether to start a motion of a first object placed in the virtual space; if it is judged to start the motion of the first object, automatically controlling the motion of the first object in a predetermined moving direction; if it is judged to start the motion of the first object, locating a plurality of effect objects at a front side in the moving direction from a location of the first object; and making the plurality of effect objects sequentially not displayed in proximate order from the location of the first object at time that it is judged to start the motion of the first object.

In accordance with a second aspect of the present invention, A method for generating an image in a virtual space seen from a predetermined viewpoint, comprises: judging whether to start a motion of a first object placed in the virtual space; if it is judged to start the motion of the first object, automatically controlling the motion of the first object in a predetermined moving direction; if it is judged to start the motion of the first object, locating an effect object at a front side in the moving direction from a location of the first object; and making the effect object sequentially not displayed from a side proximate to the location of the first object at time that it is judged to start the motion of the first object.

In accordance with a third aspect of the present invention, an image generation device for generating an image in a virtual space seen from a predetermined viewpoint, comprises: a judging section for judging whether to start a motion of a first object placed in the virtual space; a motion control section for, if it is judged to start the motion of the first object, automatically controlling the motion of the first object in a predetermined moving direction; a locating section for, if it is judged to start the motion of the first object, locating a plurality of effect objects at a front side in the moving direction from a location of the first object; and a nondisplay section for making the plurality of effect objects sequentially not displayed in proximate order from the location of the first object at time that it is judged to start the motion of the first object.

In accordance with a fourth aspect of the present invention, an image generation device for generating an image in a virtual space seen from a predetermined viewpoint, comprises: a judging section for judging whether to start a motion of a first object placed in the virtual space; a motion control section for, if it is judged to start the motion of the first object, automatically controlling the motion of the first object in a predetermined moving direction; a locating section for, if it is judged to start the motion of the first object, locating an effect object at a front side in the moving direction from a location of the first object; and a nondisplay section for making the effect object sequentially not displayed from a side proximate to the location of the first object at time that it is judged to start the motion of the first object.

According to the method of the first aspect and the apparatus of the third aspect of the present invention, when the object is judged to start the motion, it is possible to locate a plurality of effect objects at a front side in the moving direction from the location of the object, and to make the plurality of effect objects sequentially not displayed in the proximate order from the object. Further, according to the method of the second aspect and the apparatus of the fourth aspect of the present invention, it is possible to locate an effect object at a front side in the moving direction from the location of the object and to make the object sequentially not displayed from the side proximate to the object.

The effect object is an object located for an effect in order to express a momentum. In other words, when the object start the motion, by expressing a plurality of effect expressions in a direction where the object is to move, it is possible to express the momentum at the motion start effectively. Further, since it is not necessary to change the shape of the moving object itself, nor express injection indicating a propulsive force of the motion behind the object, it is applicable to even a case where a reality is required, or a condition of the object itself to start the motion, or a condition where the object is moved by being hit with another object. Thereby, it is possible to enhance versatility.

Preferably, in the method of the first aspect of the present invention, the making the plurality of effect objects sequentially not displayed includes making the plurality of effect objects located at a rear side in the moving direction from the location of the first object, sequentially not displayed according to the controlling the motion of the first object.

Preferably, in the method of the second aspect of the present invention, the making the effect object sequentially not displayed includes making a rear side of the effect object in the moving direction, sequentially not displayed according to the controlling the motion of the first object.

According to the above-mentioned method of the first aspect, when the effect objects are located in a rear side in the moving direction of the object under the motion control, it is possible to make them sequentially not displayed. In other words, as the object passes the effect objects, it is possible to make the passed effect objects sequentially disappear.

According to the above-mentioned method of the second aspect, it is possible to make a part of the effect object at a rear side in the moving direction of the object under the motion control, sequentially not displayed. In other words, as the object passes the effect object, it is possible to make a part of the effect object where the object has passed disappear, for example from its edge little by little.

Therefore, by adding an effect expression during the limited time from right before the object starts the motion to right after the object has started the motion, it is possible to make an impression more effectively.

Preferably, the method of the first aspect of the present invention further comprises changing color information of the plurality of effect objects in accordance with the motion of the first object being controlled.

Preferably, the method of the second aspect of the present invention further comprises changing color information of the effect object in accordance with the motion of the first object being controlled.

The color information is, for example, brightness information of three primary colors of R (Red), G (Green) and B (Blue), transparency degree, opaque degree or the like.

According to the above-mentioned method of the first aspect, according to the motion of the object, it is possible to change the display of the effect objects. According to the above-mentioned method of the second aspect, according to the motion of the object, it is possible to change the display of the part of the effect object.

Therefore, for example, if brightness of three primary colors as the color information to be changed, by changing the displaying color, it is possible to adjust the impression of the momentum and thereby dramatize. Further, if transparency degree or opaque degree is to be changed, by adjusting time for which the effect object is being expressed and a process where the effect object is not displayed, it is possible to dramatize the impression of the momentum in an aspect of time.

Preferably, in the methods of the first aspect and the second aspect of the present invention, the changing the color information includes changing the color information so as to decrease a transparency degree as a distance between the location of the first object and each of the plurality of effect objects becomes shorter.

According to the above-mentioned method, always according to a distance from the object, either the effect object or a part of the effect object can be made opaque as it is close to the object and can be made transparent as it is far from the object. Therefore, it is possible to express the effect as if insubstantial entities were continuously flying out from the object toward the moving direction.

Preferably, in the method of the first aspect of the present invention, the locating the plurality of effect objects includes: determining a plurality of locations where the first object is to pass with the motion of the first object controlled; and locating at each of the plurality of locations determined, an object showing a posture of the first object at time that the first object arrives at the each of the plurality of locations, as each of the plurality of effect objects.

According to the above-mentioned method, it is possible to display a posture of the object in the future at the location of the effect object. Therefore, it is possible to make an impression as if the effect object were showing a future image of an event to be happening.

Preferably, in the method of the first aspect of the present invention, the plurality of effect objects are plate-like objects on which an image is mapped, the image being seen from a viewpoint different from the predetermined viewpoint, and the locating the plurality of effect objects includes locating the plurality of effect objects so as to intersect the moving direction by a predetermined angle.

In view of computation load, it is preferably to have the effect object as a simple shape (for example, plate-like). However, if the effect objects are placed as simple plate-like objects along the moving direction, when the viewpoint for image generation moves, it appears to be clear that plate-like objects are placed, and thereby there is a possibility of not being able to obtain a desired effect.

According to the above-mentioned method, it is possible to place the plate-like objects on which an image is mapped, the image being seen from a different viewpoint, so as to intersect to the moving direction of the object.

Therefore, even if a location of the viewpoint being a base of the image generation is changed, it is possible to make a state where an image seen from a different viewpoint can be seen, and with little computation load, it is possible to always display a image of the effect object being solid with depth. Thereby, it is possible to have a stable effect regardless of the location of the viewpoint being the base of the image formation.

Preferably, in the method of the first aspect of the present invention, the first object comprises a plurality of action-receiving parts; a plurality of pieces of effect object information is provided to each of the plurality of action-receiving parts, the judging whether to start the motion of the first object includes judging to start the motion of the first object if any one of the plurality of action-receiving parts satisfies a predetermined action-receiving condition; and the locating the plurality of effect objects includes locating the plurality of effect objects based on the plurality of pieces of effect object information corresponding to the action-receiving part that is judged to satisfy the action-receiving condition.

Preferably, in the method of the second aspect of the present invention, the first object comprises a plurality of action-receiving parts; effect object information is provided to each of the plurality of action-receiving parts, the judging whether to start the motion of the first object includes judging to start the motion of the first object if any one of the plurality of action-receiving parts satisfies a predetermined action-receiving condition; and the locating the effect object includes locating the effect object based on the effect object information corresponding to the action-receiving part that is judged to satisfy the action-receiving condition.

For example, if the object comprises a plurality of parts jointed by way of a joint structure, a posture of the object differs at the motion depending upon on which part a force has acted. Nonetheless, if the effect object is always located under the same condition, the inconvenience that the effect object does not correspond to the posture of the object may happen.

According to the above-mentioned method of the first aspect, according to the action-receiving part of the object, a plurality of effect objects are provided respectively, and information for locating the plurality of effect objects according to the case that the action-receiving part satisfies the predetermined action-receiving condition is provided so as to relate to the action-receiving part. According to the above-mentioned method of the second aspect, according to the action-receiving part of the object, an effect object is provided respectively, and information for locating the effect object according to the case that the action-receiving part satisfies the predetermined action-receiving condition is provided so as to relate to the action-receiving part.

Therefore, even if a posture of the object at the motion differs depending upon on what part a force has acted, it is possible to locate the effect object suitably for the posture, and thereby it is possible to achieve a suitable effect expression.

In accordance with a fifth aspect of the present invention, an information storage medium has information recorded thereon, when the information is loaded onto an operating apparatus, the information making the operating apparatus execute the method of the first aspect or the second aspect.

As the information storage medium, various types of IC memory, CD-ROM, DVD, MO, memory card, memory cassette, hard disk and the like correspond. By making the computer device load a group of control information from these information storage medium to perform the computation process, it is possible to achieve the above-mentioned effects.

In accordance with a sixth aspect of the present invention, a data signal embodied in a carrier wave, comprises information used for executing the above-mentioned method of the first aspect or the second aspect.

In accordance with a seventh aspect of the present invention, a program, when the program is loaded onto an operating device, the program makes the operating device execute the method of the first aspect or the second aspect.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 6A is a view showing a case where the second effect objects are deformed so as to contract in a longitudinal direction based on the edge at a further side from an enemy character E; FIG. 6B is a view showing a case where the second effect objects are composed of a plurality of polygons C1$n$ in the longitudinal direction;

FIG. 10 is a view showing one example of effect object information;

PREFERRED EMBODIMENTS OF THE INVENTION

Hereinafter, with reference to FIG. 1 to FIG. 14, as one embodiment according to the present invention, described as an example is a case of executing a martial art game in a home game device which is one example of an image formation device.

[Description of Structure]

Figure 1:
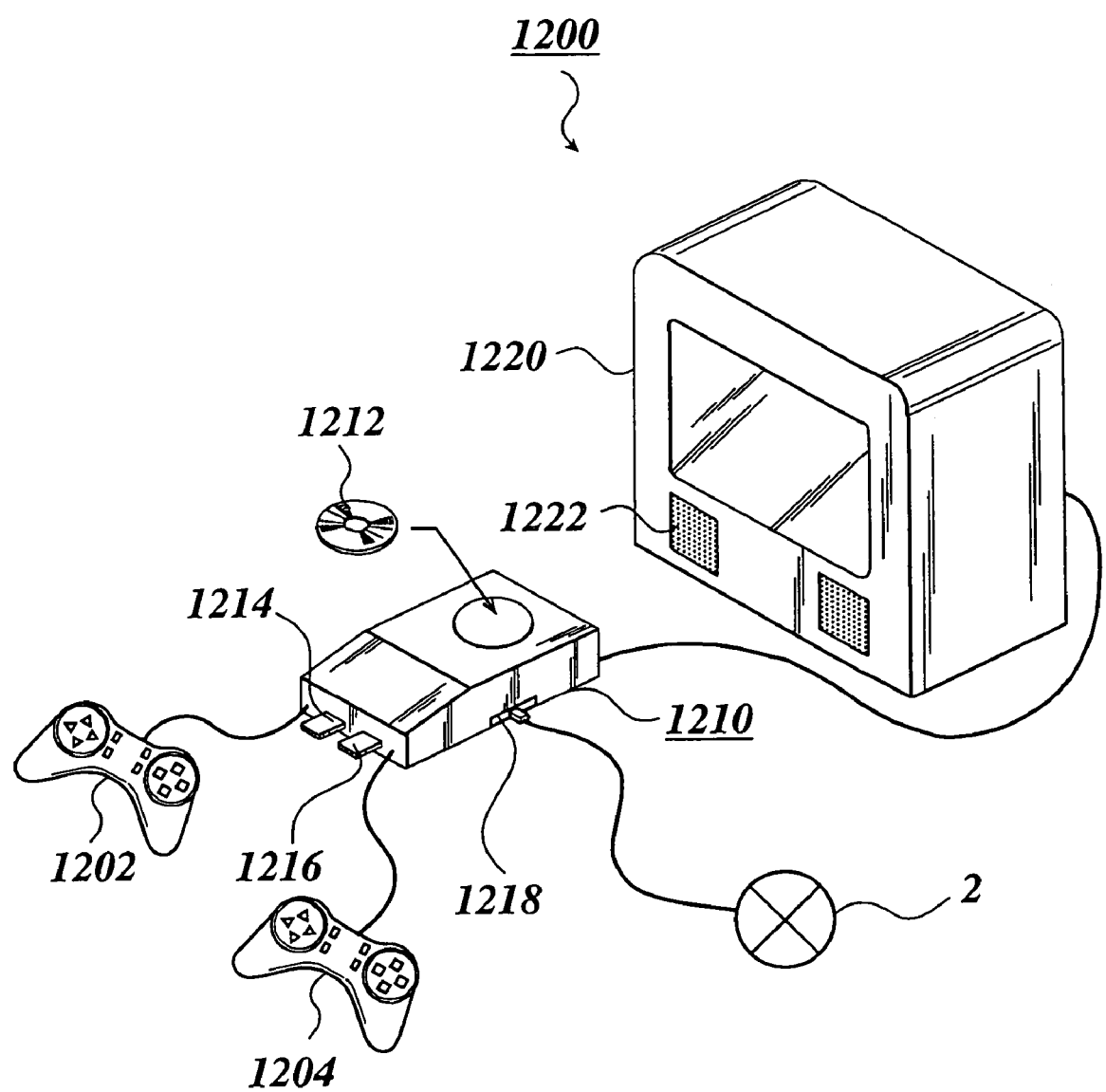
FIG. 1 is a view showing one example of a home game unit to which the present invention is applied.

FIG. 1 is a view showing one example of the home game unit to which the present invention is applied. As shown in FIG. 1, the home game unit 1200 comprises a main unit 1210 and game controllers 1202 and 1204, and is connected to a display 1222 equipped with a speaker 1222.

Game information as one of image generating information required to execute the game, such as a game program and initial setting data, is stored in an information storage medium which is detachable from the main unit 1210, for example, a CD-ROM 1212, an IC memory 1214, a memory card 1216 or the like. Alternatively, the game information is obtained from an external device through a communication device 1218 which is equipped on the main unit 1210, the external device being connected to a communication line 2.

The communication line 2 means a communication channel which allows data transmission and reception. In other words, the communication line may be a dedicated line (dedicated cable) for direct connection, a LAN such as Ethernet™ or the like, and further may include a communication network such as a telephone network, a cable network, Internet or the like, regardless of whether its communication method is wired or wireless.

The main unit 1210 is equipped with a processing unit such as a CPU or the like, and a reader for the information storage medium such as the IC memory, the CD-ROM 1212 or the like. The main unit 1210 executes various game processes based on the game information read from the CD-ROM 1212 or the like and an operation signal inputted from the game controllers 1202 and 1204, displays game images on the display 1220, and outputs game sounds from the speaker 1222.

A player operates an arrow key, an analog stick or various types of buttons equipped on the game controllers 1202 and 1204, while viewing the game images displayed on the display 1220, and enjoys operating the movement of the character in the martial arts game.

Figure 2:
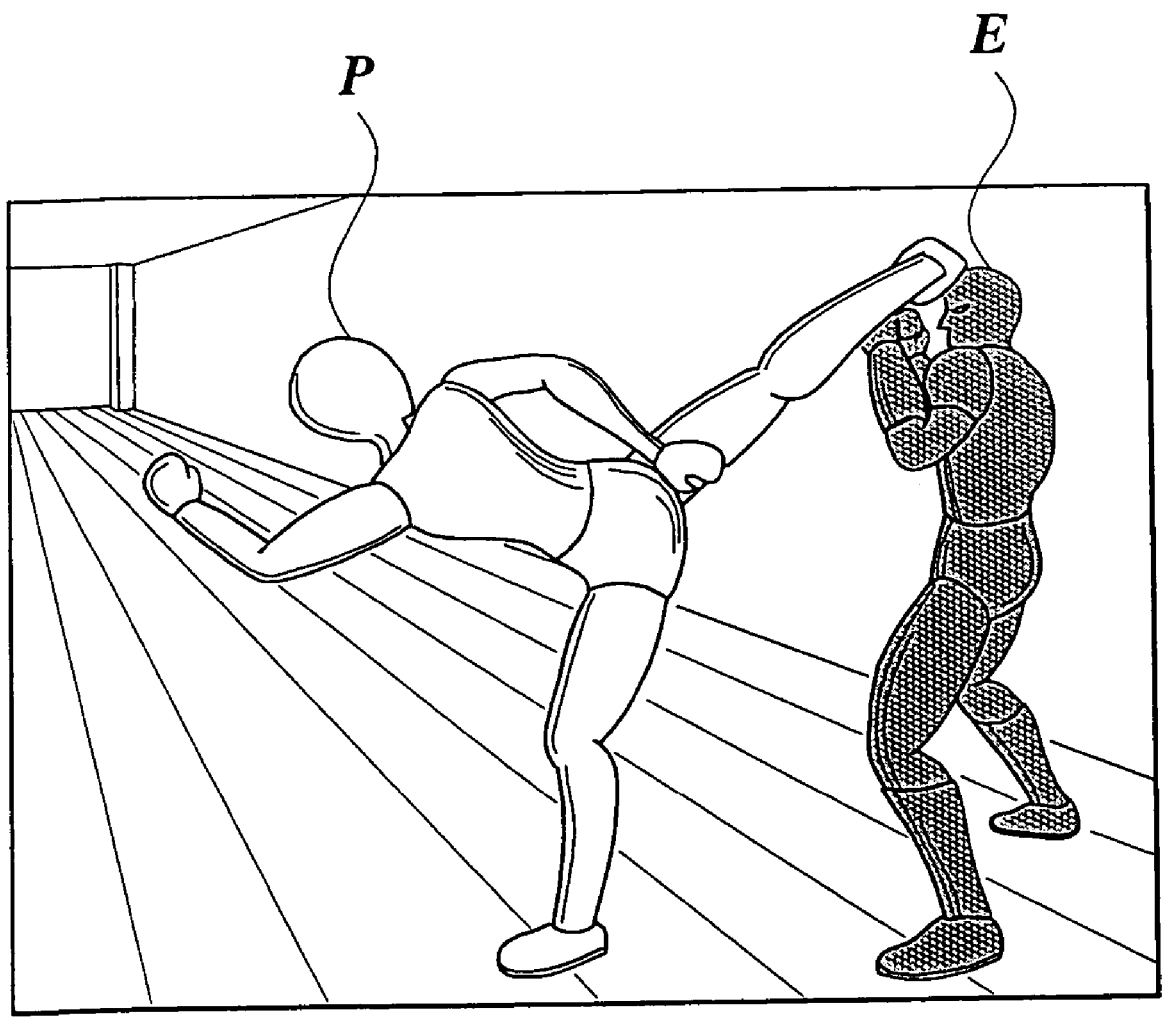
FIG. 2 is a view showing one example of a game screen in a martial arts game to which the present invention is applied.

FIG. 2 is a view showing one example of a game screen of a martial arts action game in the present embodiment. By setting an object such as a character, a background and the like in a virtual space, the game screen is displayed as a three-dimensional CG (computer graphic) image seen from a predetermined viewpoint in the virtual space. The game screen, for example, displays a player character P operated by the player and an enemy character E operated by a computer. The player advances from one stage to another by operating the character P and beating the enemy character E with a punch, a kick and the like. After the player clears a predetermined condition (for example, beating a enemy boss character, rescuing a hostage, procuring a goal object, or the like) or when damage sustained by the player character P is not less than a predetermined amount, the game ends.

In FIG. 2, the player character P executes an upper kick, hitting a head of the enemy character E1. The present embodiment applies to the enemy character E1 having received a blow from the player character P, a visual effect as follows. Here, as a matter of practical convenience, description is made with an example of the player character P executing an upper kick. However, needless to say, other technique may be applied in the same way.

[Description of Principle of Visual Effect Display]

Figure 3A:
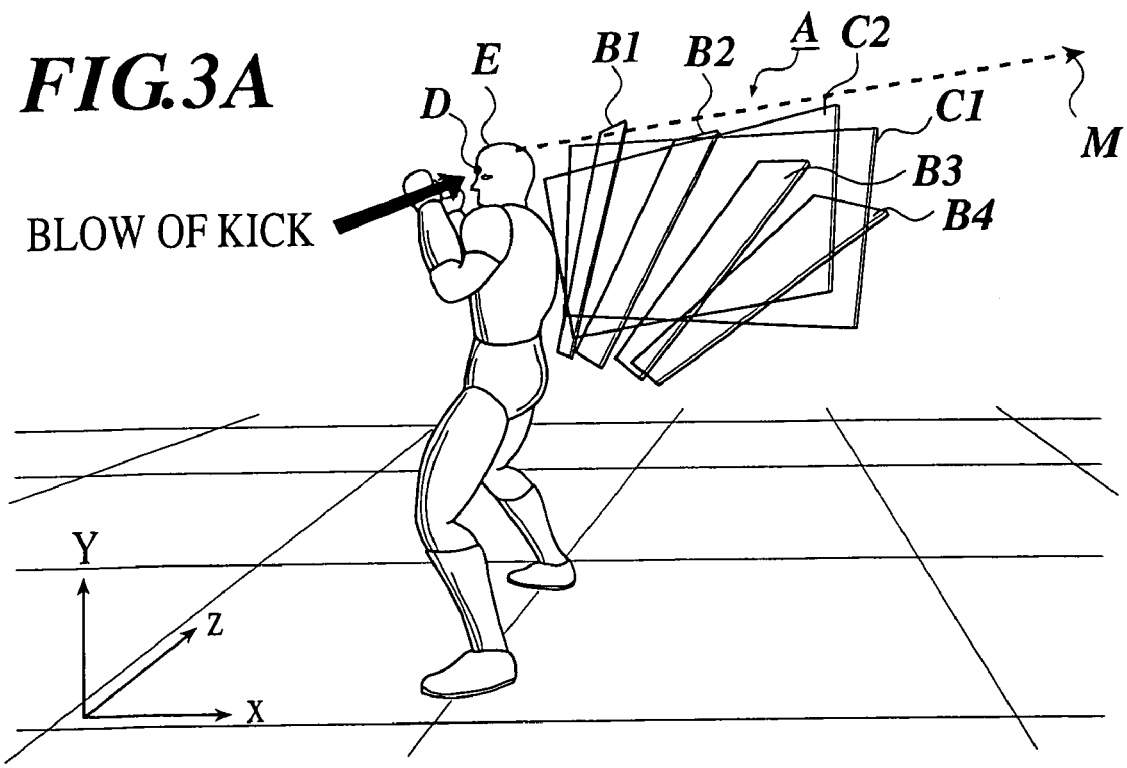
FIGS. 3A and 3B are conceptual views illustrating a principle of a visual effect display.
Figure 3B:
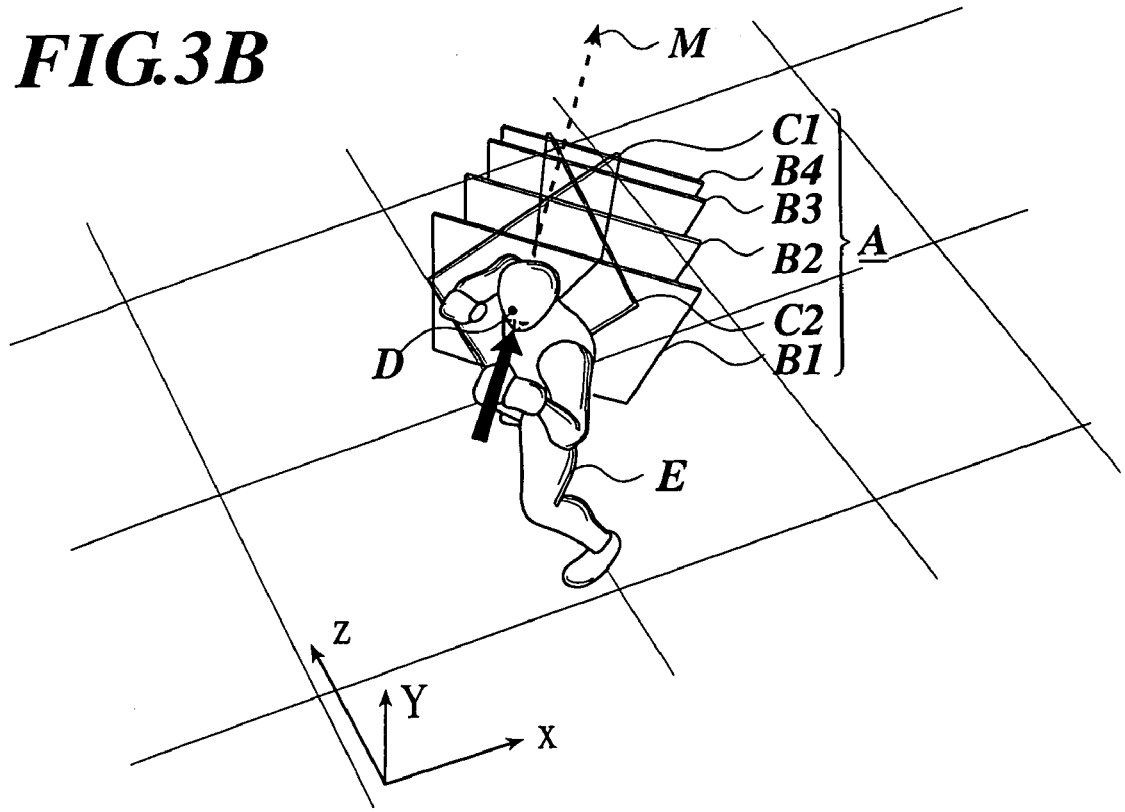

FIGS. 3A and 3B are views illustrating a principle of a visual effect display in the present embodiment. In the present embodiment, the visual effect display is applied if it is judged that a predetermined motion start event has occurred on a designated object to be an effect subject. The subject of the visual effect display is the enemy character E, and the judgment that the kick of the player character P has hit the enemy character E corresponds to the occurrence of the motion start event. As shown in FIGS. 3A and 3B, an effect object group A is displayed as the visual effect display in a direction where the enemy character is blown away (backwards) by a kick at the moment that the kick hits the enemy character E.

The effect object group A comprises first effect objects B1 to B4, and second effect objects C1 and C2. These effect objects are positioned so as to intersect each other. In the present embodiment, each object effect composing the effect object group A is a plate-like object. These effect objects are predetermined according to a position and rotation of a representative point of the effect objects in a local coordinate of enemy character E. Each object effect of the effect object group A is managed so as to correspond to identification information (for example, ID information on enemy character E) indicating being added to which enemy character E.

Figure 4A:
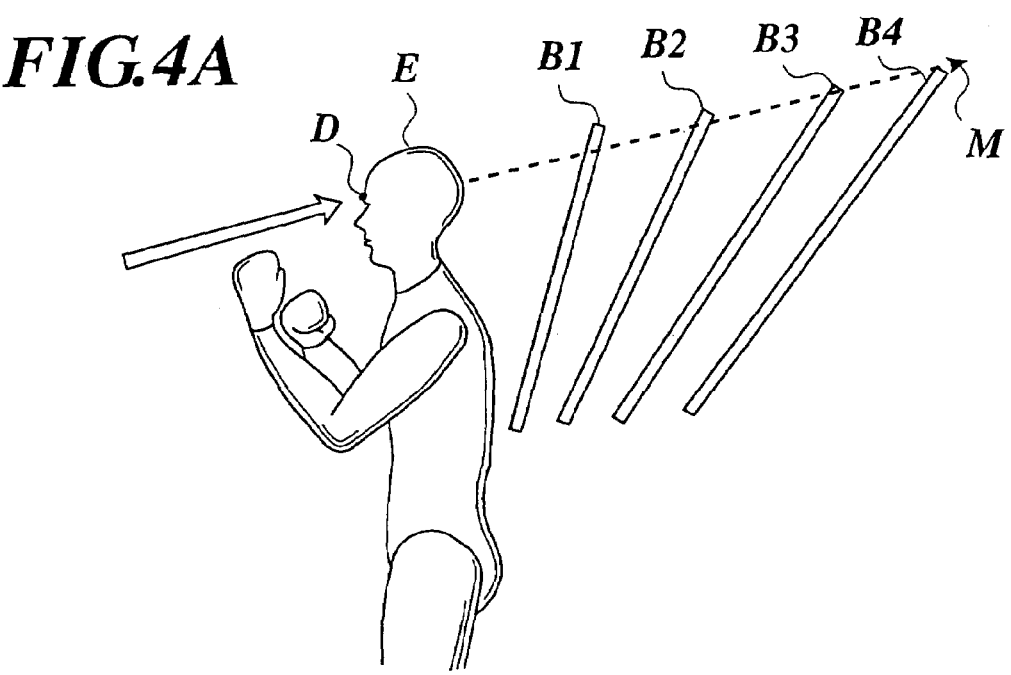
FIGS. 4A, 4B and 4C are views illustrating positions of first effect objects B1 to B4.
Figure 4B:
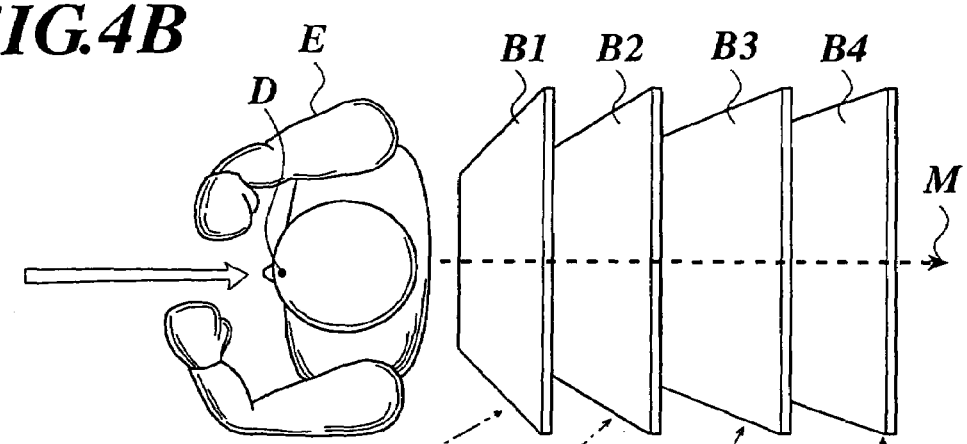
Figure 4C:
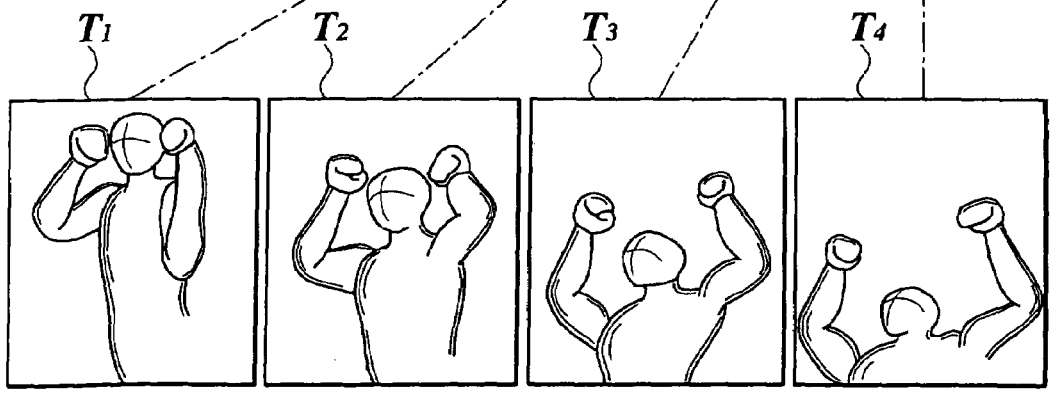

FIGS. 4A, 4B and 4C are conceptual views illustrating positions of the first effect objects B1 to B4 in the present embodiment. As shown in FIGS. 4A, 4B and 4C, the first effect objects B1 to B4 are rectangular plate-like objects. A hitting point D hit by a kick of the player character P is defined as a start point and the first effect objects B1 to B4 are sequentially arranged in a screen-like form toward a front of a moving direction vector M (a direction to be blown away) of the enemy character E, that is, toward a front of the moving direction of the enemy character E.

Then, appearance images T1 to T4 are respectively mapped on the first effect objects B1 to B4, the appearance images T1 to T4 drawing the enemy character being blown away by the kick from the front. More specifically, for example, the appearance images T1 to T4 are prepared as images showing each state of the enemy character E moving to each position of the first objects B1 to B4, and the mapping is done in the order of the first objects B1 to B4. In other words, the first effect objects B1 to B4 corresponds to future images of an event to be occurred.

In this respect, plate-like surfaces of the first effect objects B1 to B4 in the present embodiment are generally set so as to face the front of the enemy character E, and are also set so as to make transparency degree thereof higher as leaving from the enemy character E further. In addition, after the kick blows the enemy character E away, in order to express a state where moving speed gradually reduces, arrangement intervals of the first effect objects B1 to B4 are set so as to be gradually narrower.

Further, in the present embodiment, the first effect objects B1 to B4 are not always positioned in parallel. Relative angles of the first effect objects B1 to B4 are set according to an inclination change when a motion of the enemy character E is controlled.

For example, as shown in FIGS. 4A, 4B and 4C, the first effect objects B1 to B4 displayed when the head of the enemy character E receives a kick, the head of the enemy character E moves before the toe moves. Therefore, the intervals between the adjacent first effect objects B (for example, between B1 and B2, B2 and B3, B3 and B4) are set so as to be narrower at the bottom side than at the top side. By making the differential between the top end and bottom end larger, it is possible to make the enemy character E appear to bend from the torso to above and thereby to more effectively show a destructive force of the kick.

In addition, for example, when the toe of the enemy character E is set to move first after a low kick from the player character P is received, the intervals are made wider at the bottom side (toe side) than at the top side (torso side). When the enemy character E receives a middle kick at the abdominal part from the player character P, it is considered that the entire body of the enemy character is to move approximately all at once, and the intervals between the adjoining first effect objects B are made approximately the same at the top side and the bottom side.

Figure 5A:
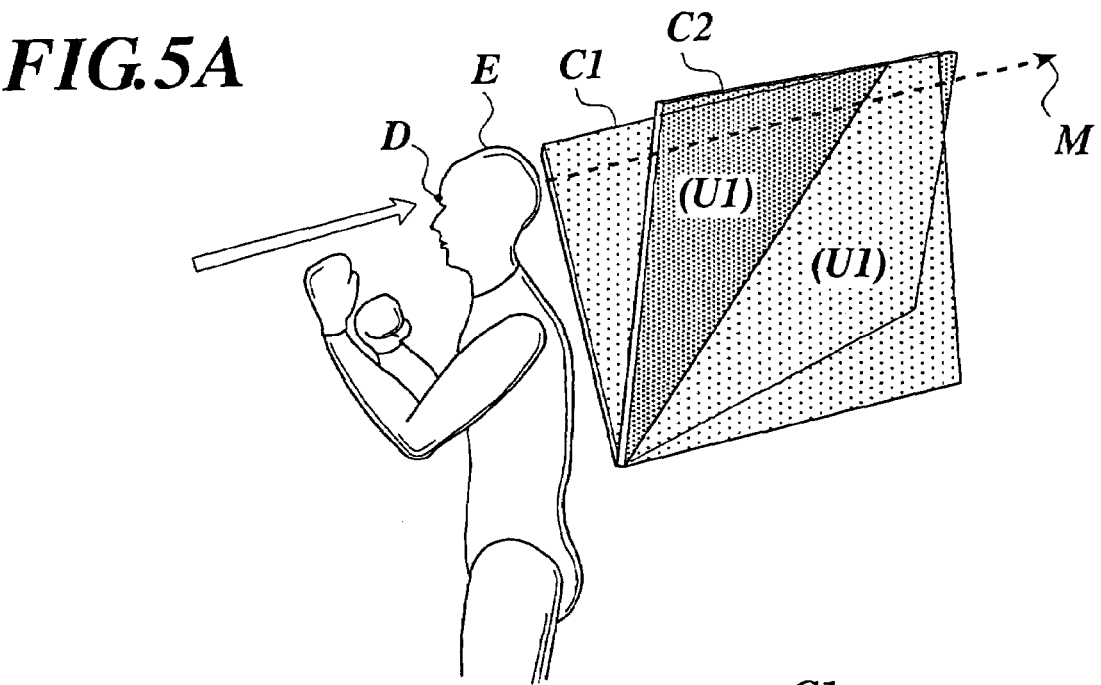
FIGS. 5A, 5B and 5C are views illustrating positions of second effect objects C1 and C2.
Figure 5B:
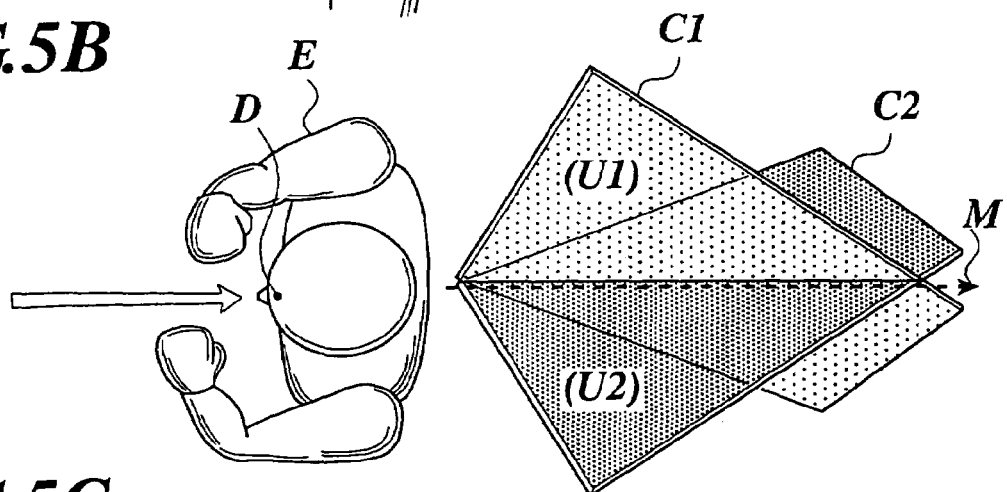
Figure 5C:
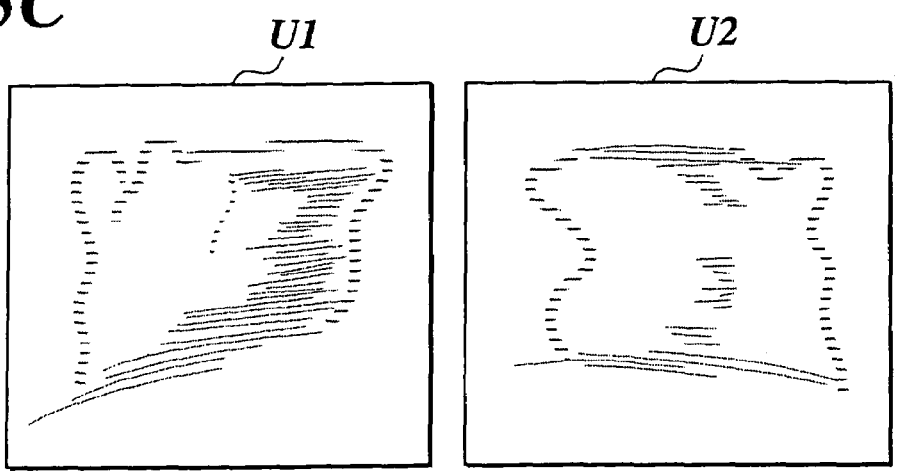

FIGS. 5A, 5B and 5C are views illustrating positions of the second effect objects C1 and C2 in the present embodiment. The second effect objects C1 and C2 are rectangular plate-like objects. The second effect objects C1 and C2 are arranged so as to make longitudinal directions thereof approximately along the moving direction vector M of the enemy character E being blown away by the kick and so as to make a surface of the plate viewable when it is seen from the side of the enemy character E. Further, the second effect objects C1 and C2 are displayed translucently.

As shown in FIGS. 5A, 5B and 5C, in the present embodiment, the second effect objects C1 and C2 are set to mutually form a 'V' shape where the second effect objects C1 and C2 are separated from each other as they come closer to the upper edge side at the edge part near the enemy character, and they intersect each other toward the further side from the enemy character E.

On the front and back surface of the second effect objects C1 and C2, appearance images U1 and U2 are respectively mapped, the appearance images U1 and U2 drawing appearances where the enemy character E is being blown away, seen from the side of the enemy character E. More specifically, for example, the side views of the upper body of enemy character E up to four frames from the next drawing frame after the kick hits are respectively prepared for left and right sides with synthesized images so as to show the blur effect on the same screen, and are mapped on each screen of the second effect objects C1 and C2.

In the present embodiment, the first effect objects B1 to B4 and the second effect objects C1 and C2 positioned so as to intersect as shown in FIGS. 3A and 3B are displayed translucently on the game screen so as to fold on one another. Thereby, regardless of the position of a virtual viewpoint, the effect object A group can be displayed as an integrated solid shape to some extent seen from any angle.

When the effect object group A is positioned and displayed, a motion of the enemy character E is then controlled at each drawing frame, and the effect object disappears or is not displayed with a deformation process applied.

Figure 6A:
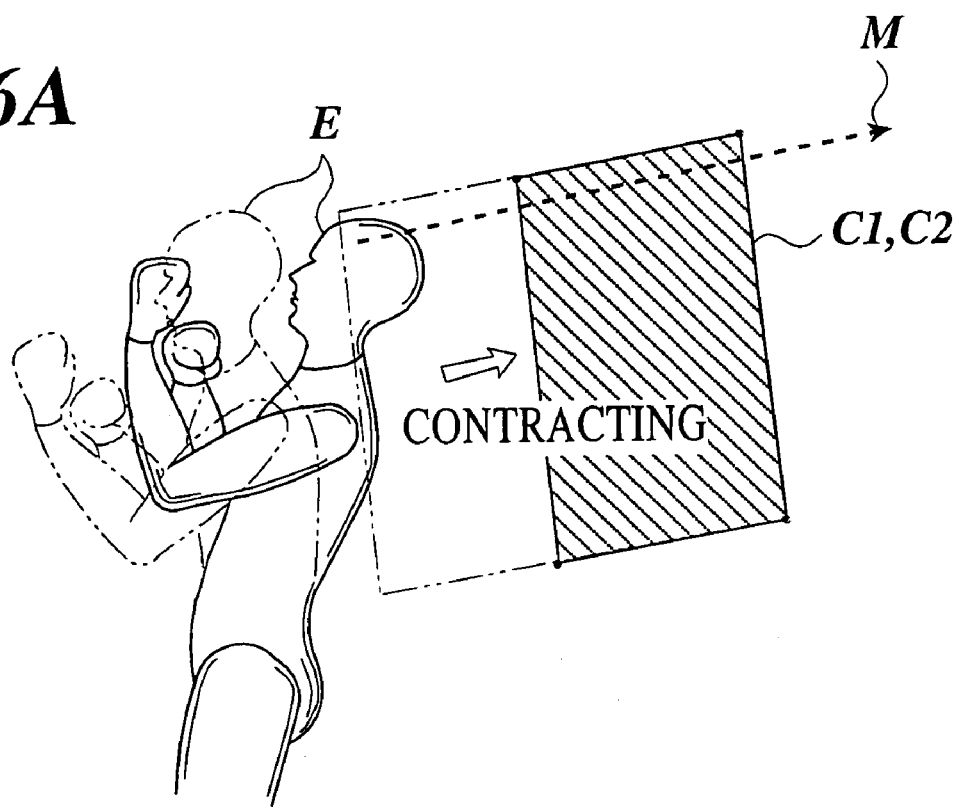
FIGS. 6A and 6B are views illustrating a principle of deforming the second effect objects.
Figure 6B:
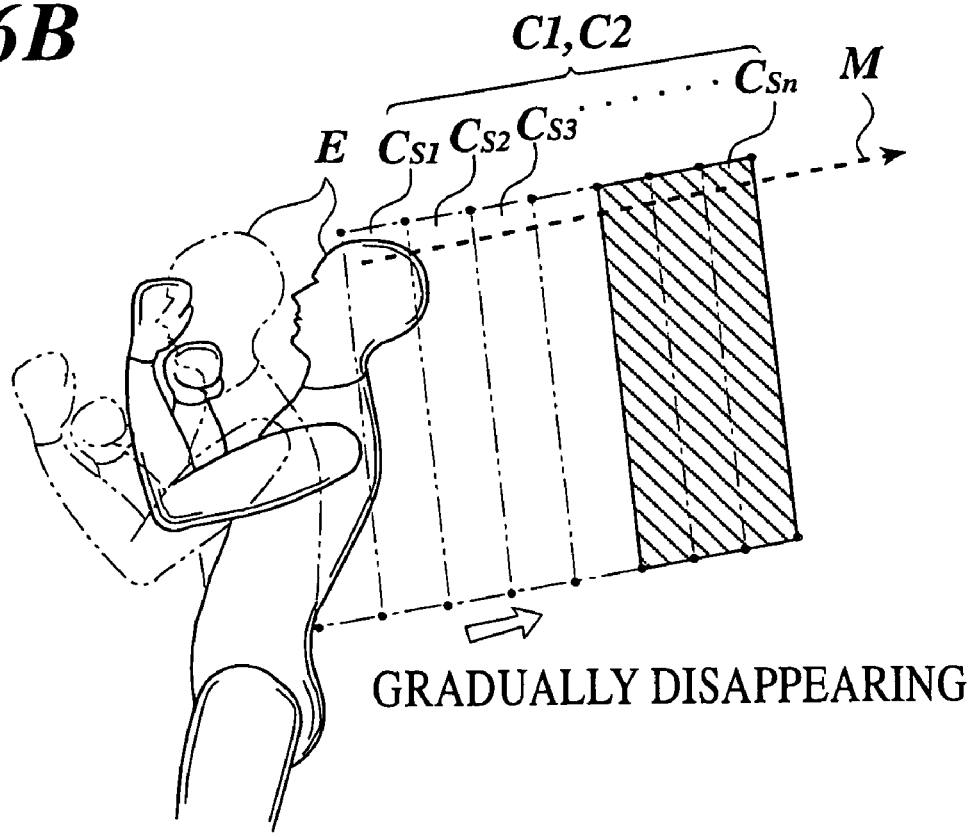

In the present embodiment, the first effect objects B1 to B4 disappear or are not displayed in the order of B1, B2, B3 . . . , which is the order of proximity to the enemy character E, under the condition that the motion of the enemy character E is controlled and the first effect objects B1 to B4 are positioned further rearward than the enemy character E in the moving direction. The second effect objects C1 and C2 as shown in FIG. 6A are deformed so as to contract in the longitudinal direction based on the edge at the far side from the enemy character E. Alternatively, as shown in FIG. 6B, if the second effect objects C1 and C2 are objects comprising multiple polygons Cs toward the longitudinal direction, they may be made to gradually disappear from the polygon Cs proximate to the enemy character E according to the extent of the drawing.

Therefore, if the visual effect display shown on the game screen is continually viewed, when the enemy character E receives a kick from the player character P, the effect object group A appears at the moment in the direction where the enemy character E is to be blown away by the kick. The effect object group A then gradually disappears from view as the enemy character E passes it by. In other words, it is possible to visually express an impact at the moment that the enemy character E receives a blow, and thereby to make the game screen have stronger impression.

In the present embodiment, these types of visual effect displays are prepared in advance for each blow direction of a part and an area where the enemy character E receives the blow. If the enemy character E is judged to have received a blow, the part and range that received the blow, and the direction in which the blow is received are determined, and a corresponding visual effect display is loaded, positioned and displayed.

Figure 7A:
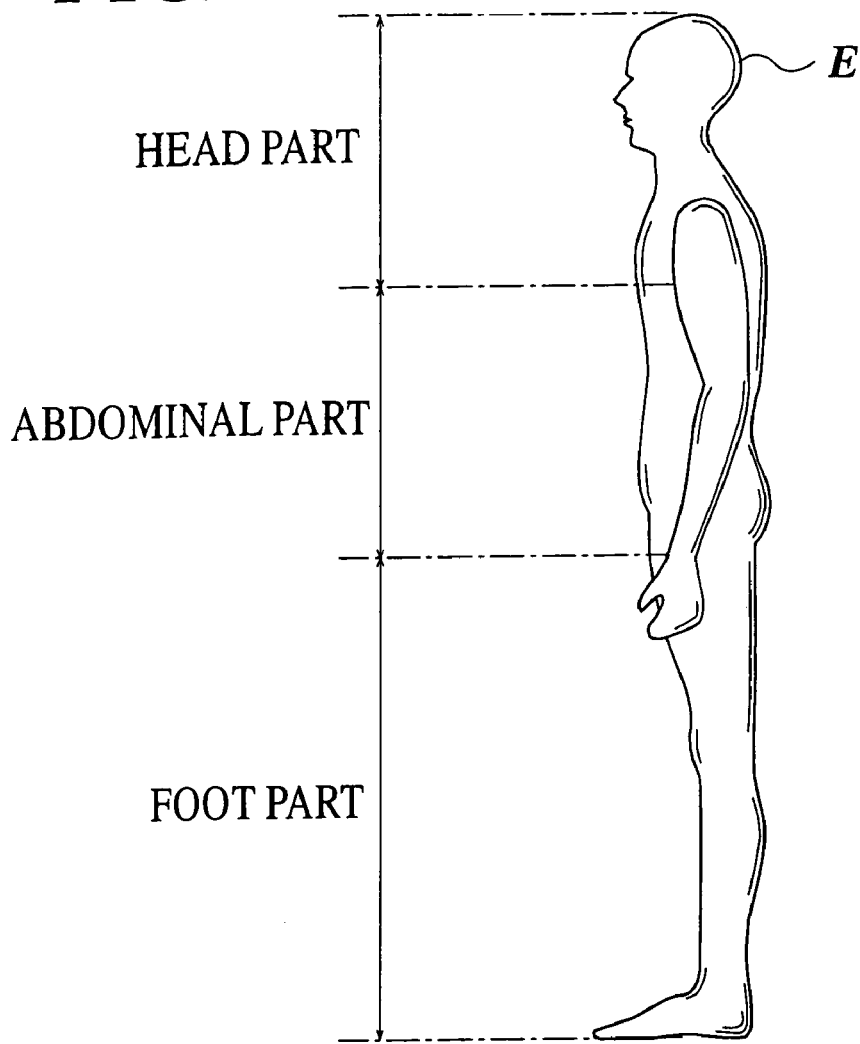
FIG. 7A is a view showing one example of divisions of determined parts.
Figure 7B:
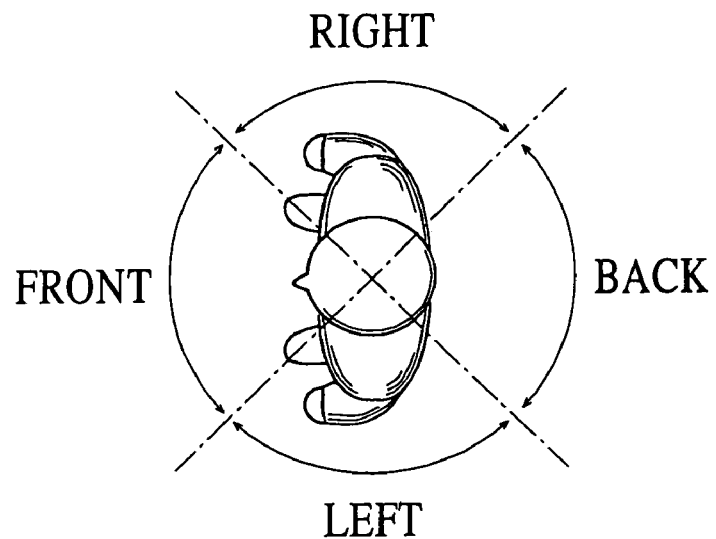
FIG. 7B is a view showing one example of divisions of directions in which a blow is received.

FIGS. 7A and 7B are views showing one example of divisions of determined parts and divisions of directions in which a blow is received. As shown in FIG. 7A, these determined parts are divided into three parts; the head part, chest part and leg part. As shown in FIG. 7B, the direction in which the blow is received is determined by calculating the relative angle of the moving direction vector M and the local coordinates of the enemy character E, and dividing them into four directions; front, rear, right and left.

The divisions of these parts are not limited to the above-mentioned example. For example, the parts may be divided into finer detail such as the head part, left/right arm part, left/right chest part, abdominal part, waist part, left/right leg part, or the like. In addition, the direction in which the blow is received may be judged as any of eight directions, the four front/rear/right/left directions with intermediate directions thereof. Further, visual effect displays may be prepared in advance according to a type of blow, for example, one by an item such as a punch, stick or the like, shot from a rifle, technique other than a kick, etc.

Needless to say, the shape and the number of objects of the first effect objects B1 to B4 and second effect objects C1 and C2 may be set according to necessity. Further, the intersection relation of the first effect objects B1 to B4 and second effect objects C1 and C2 is not limited to the above-mentioned example, and may be set as desired even if the virtual viewpoint position changes unless the effect object group A is separated and becomes viewable and unviewable from time to time.

[Function Block Description]

Figure 8:
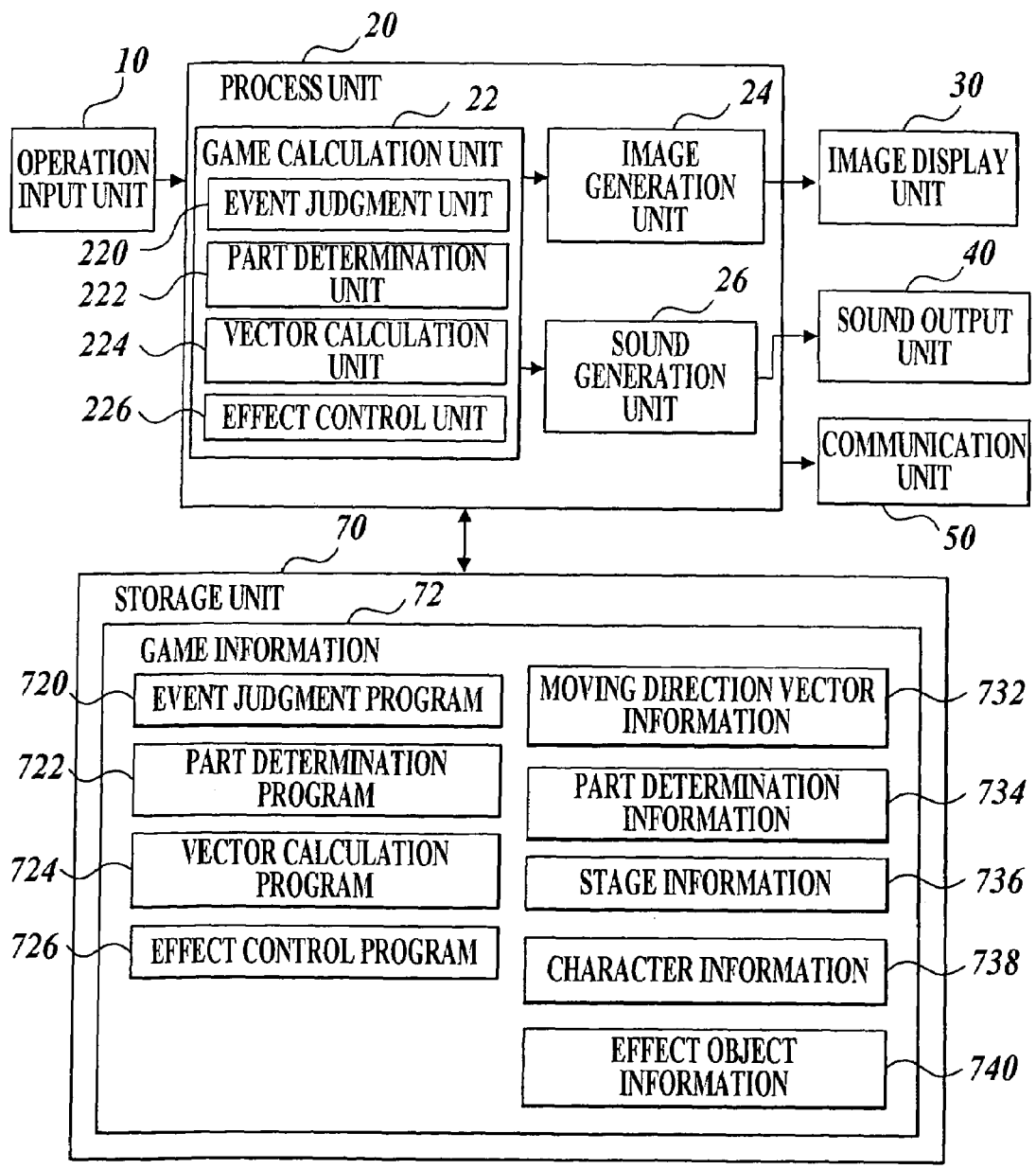
FIG. 8 is a block diagram showing one example of a functional structure of the home game unit according to the present invention.

FIG. 8 is a block diagram showing one example of a functional structure of the present embodiment. As shown in FIG. 8, the home game unit 1200 comprises an operation input unit 10 for entering inputs from player operation, a processing unit 20 for processing the calculation associated with device and game control, an image display unit 30 for outputting the game screen on a display, a sound output unit 40 for outputting game sounds, a communication unit 50, and a storage unit 70 for storing various types of programs and data.

The operation input unit 10 may, for example, be button switches, levers, dials, a mouse, keyboard, and various types of sensors. The operation input unit 10 inputs the operation from the player operating the player character P, and outputs these operation signals to the processing unit 20. In the present embodiment, the game controllers 1202 and 1204 of FIG. 1 corresponds to the operation input unit 10.

The processing unit 20 controls the entire home game unit 1200, and performs various types of processes such as game calculations and the like. These functions are implemented by a hardware, for example, a CPU (CISC type, RISC type), ASIC (gate arrays, etc) or the like, associated control programs and the like. The main unit 1210 in FIG. 1 corresponds to these hardware/programs.

The processing unit 20 comprises a game calculation unit 22 for performing a calculation process mainly associated with the game, an image generation unit 24 for generating image signals for displaying various types of data calculated by the process of the game calculation unit 22 on the game screen, and a sound generation unit 26 for generating audio signals for outputting game sounds such as sound effects, BGM, etc.

The game calculation unit 22 performs the various game processes based on operation input signals from the operation input unit 10 and the programs and data loaded from the storage unit 70. The game processes, for example, are the implementation of processes such as positioning objects in the virtual space, controlling the motion of the enemy character E and controlling the motion of the player character P based on operation inputs from the operation input unit 10, judging intersection (hit check), calculating the game results (score), establishing the viewpoint and view line direction, etc.

In the present embodiment, the game calculation unit 22 comprises an event judgment unit 220 to judge whether or not the predetermined motion start event has occurred on the enemy character E object, a part determination unit 222 to determine the part of the enemy character E on which the motion start event has occurred, a vector calculation unit 224 to calculate the moving direction vector M that indicates a moving direction of the enemy character E on which the motion start event has occurred, and an effect control unit 226 for controlling display of the effect object group.

The event judgment unit 220 judges whether or not a predetermined motion start event (in this case, a blow by the player character P) has occurred on any object (in this case, the enemy character E) that is subject to the visual display effect. More specifically, for example, the judgment whether or not the kick by the player character P has hit the enemy character E object is made. If a visual display effect is only added to a designated technique, the event judgment unit judges whether or not the input for the predetermined technique has been made.

The part determination unit 222 determines at what part of the object the event has occurred if the event judgment unit 220 judges that the predetermined event has occurred. In the present embodiment, the part determination unit 222 calculates the position coordinates of the hitting point D where the leg part of the player character P object has hit, and determines what part of any of the enemy character E's head part, chest part or leg part has been hit by the kick. If the part hit by the kick is predetermined according to the type of technique, a judgment may also be made on what technique has been input.

Further, the part determination unit 222 calculates a relative angle difference between the moving direction vector and the local coordinates of the enemy character E, and judges the hit direction where the enemy character E has received the blow with comparing the relative angle difference with a predetermined condition.

The vector calculation unit 224 determines a direction in which the object moves according to the motion start event that has occurred. In the present embodiment, the vector calculation unit 224 first calculates the moving direction vector M indicating in what direction the enemy character E is to be blown away by the kick. The moving direction vector M is basically determined by the direction of an external force which is applied from the kick received by the player character P. However, if the moving direction of the object is set to be limited, the moving direction vector is set according to the limit. For example, if the object is a truck or the like, one of truck directions is the moving direction vector M.

The effect control unit 226 positions the effect object group A associated with the object on which the event judgment unit 220 has judged that the predetermined event has occurred. The effect control unit 226 performs processes such as deleting, moving, switching display/not display, deforming and the like.

The image generation unit 24 is implemented by processing devices such as the CPU, DSP, their control programs, drawing frame IC memories such as frame buffers or the like. The image generation unit 24 performs geometrical conversion and a shading process based on a position, a viewpoint position and a posture of the effect object group A and the enemy character E and player character P by the game calculation unit 22, and generates images for displaying on the game screen. The image signals of these generated images are outputted to the image display unit 30.

The sound generation unit 26 is implemented by devices such as a CPU, a DSP, their control programs and the like. The sound generation unit 26 generates sounds such as BGM and sound effects for use during the game. The sound generation unit 26 outputs its sound signals to the sound output unit 40.

The image display unit 30 displays the game screen while, for example, redrawing one frame screen every one-sixtieth of a second, based on the image signal from the image generation unit 24. The image display unit 30 is implemented by hardware such as a CRT, an LCD, an ELD, a PDP, an HMD or the like. The image display unit 30 corresponds to the display 1220 in FIG. 1.

The sound output unit 40 is a device for outputting sound effects and BGM based on audio signals from the sound generation unit 26. The sound output unit 40 corresponds to the speaker 1222 in FIG. 1.

The communication unit 50 performs data communication with external devices by being connected to a communication line. The communication unit 50 is implemented by, for example, a module such as Bluetooth™ or IrDA, a modem, a TA, a communication cable jack, and a control circuit. The communication unit 50 corresponds to the communication device 1218 in FIG. 1. Further, the communication unit 50 utilizes information such as protocols and the like shared during communications and stored in the storage unit 70 by loading it according to necessity.

The storage unit 70 stores system programs (not shown) for the processing unit 20 to perform various types of functions to integrally control the home game unit 1200, and stores the game information 72 having the programs and data necessary for performing the game. The storage unit 70 is implemented by, for example, information storage medium such as various types of an IC memory, a hard disk, a CD-ROM, an MO, a DVD or the like. The storage unit 70 corresponds to the CD-ROM 1212, IC memory 1214, and the memory card 1216 in FIG. 1.

The game information 72 contains programs and data for making the processing unit 20 function as the game calculation unit 22. The programs include the event judgment program 720, the part determination program 722, the vector calculation program 724 and the effect control program 726, for making the processing unit 20 function as the event judgment unit 220, the part determination unit 222, the vector calculation unit 224 and the effect control unit 226, respectively.

Further, as data, the game information 72 includes the moving direction vector information 732, the part determination information 734, the stage information 736, the character information 738, and the effect object information 740.

The moving direction vector information 732 stores the moving direction vector M calculated by the vector calculation unit 224.

Figure 9:
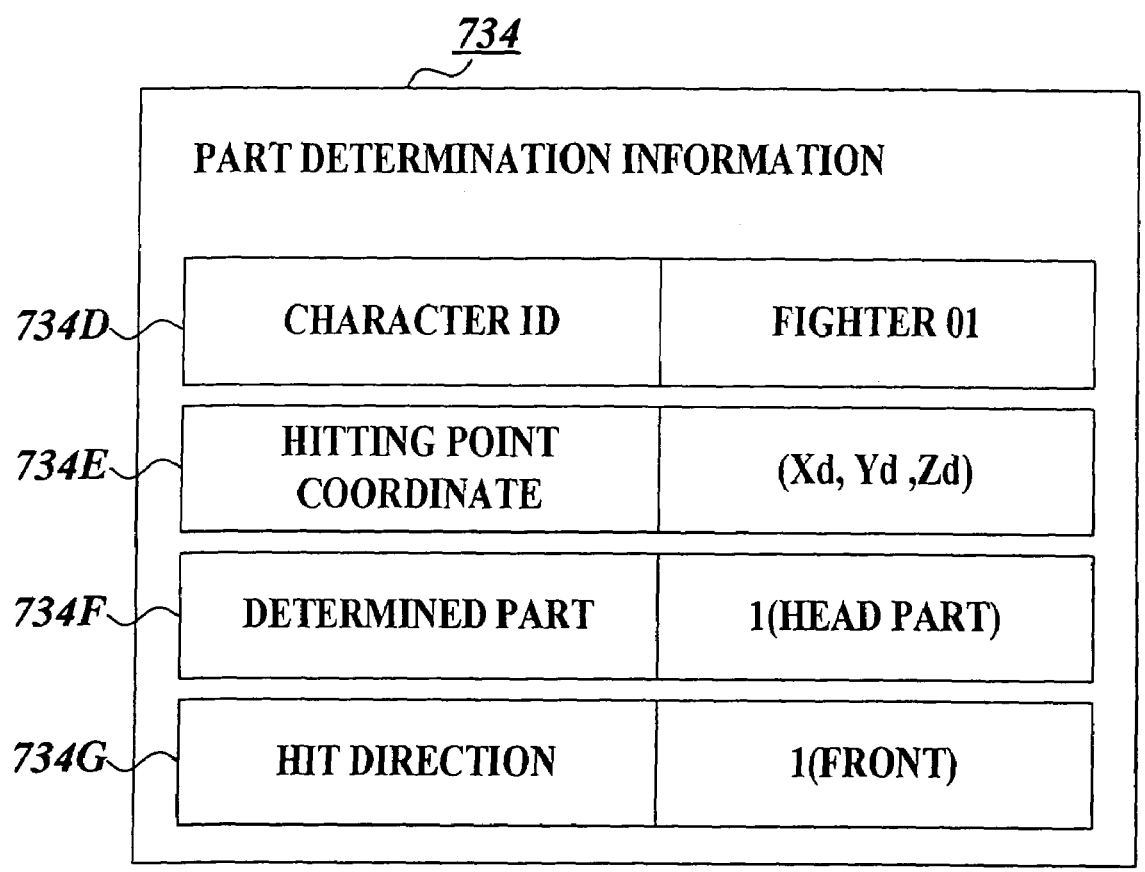
FIG. 9 is a view showing one example of part determination information.

The part determination information 734 stores information that identifies a part where the predetermined event has occurred on the enemy character E as determined by the part determination unit 222; and information associated with the hit direction in which the enemy character E received the blow. FIG. 9 is a table showing one example of the part determination information 734 in the present embodiment. The part determination information 734, for example, contains a character ID 734*a* for identifying the enemy character E, the hit point coordinate 734*b* of the hit point D, the part determination 734*c* indicating a part which has been determined (for example; the head part is a value of "1", the chest part is a value of "2", and the leg part is a value of "3") and, the hit direction 734*d* indicating a division of the direction in which the hit has been received (for example, front is a value of "1", right is a value of "2", rear is a value of "3", and left is a value of "4").

The stage information 736 stores information for setting the game stage in the virtual space. More specifically, the information 736 includes, for example, background objects, mapping data, information associated with light sources, a stage clear condition and the like.

The character information 738 stores information for positioning the player character P and the enemy character E, and controlling their motions. More specifically, the character information 738 includes, for example, character position coordinates, modeling data, motion data, mapping data, voice data, motion numbers being selected currently, and the current motion frame number.

FIG. 10 is a view describing one example of effect object information 740 in the present embodiment. The effect object information 740 stores information for making the effect control unit 226 position and control the effect object group A in virtual space.

As shown in FIG. 10, each effect object information 740 is prepared for each character ID 740a, and also for each determined parts 740b and hit directions 740c.

Further, the effect object information 740 contains an appearance image 740d, model data 740e of the effect object and positional information 740f for each of the first effect objects B1 to B4.

The positional information 740f stores information of the rotation and the position of the representative effect object of the enemy character E in the local coordinates. The model data 740e is information for determining as shape of the effect object. In the present embodiment, the first effect objects B1 to B4 are all the same models (plate-like object) but may also be set as respectively different models.

The effect object information 740 also contains the same type of information in regard to the second effect objects C1 and C2.

[Description of Process Flow]

Next, a process flow of the visual display effect in the present embodiment will be described. The process for starting the home game unit 1200, and displaying and controlling the player character P and the enemy character E is implemented in the same way as in martial arts action games of the related art. Therefore, only the process regarding the visual effect display will be described here.

Figure 11:
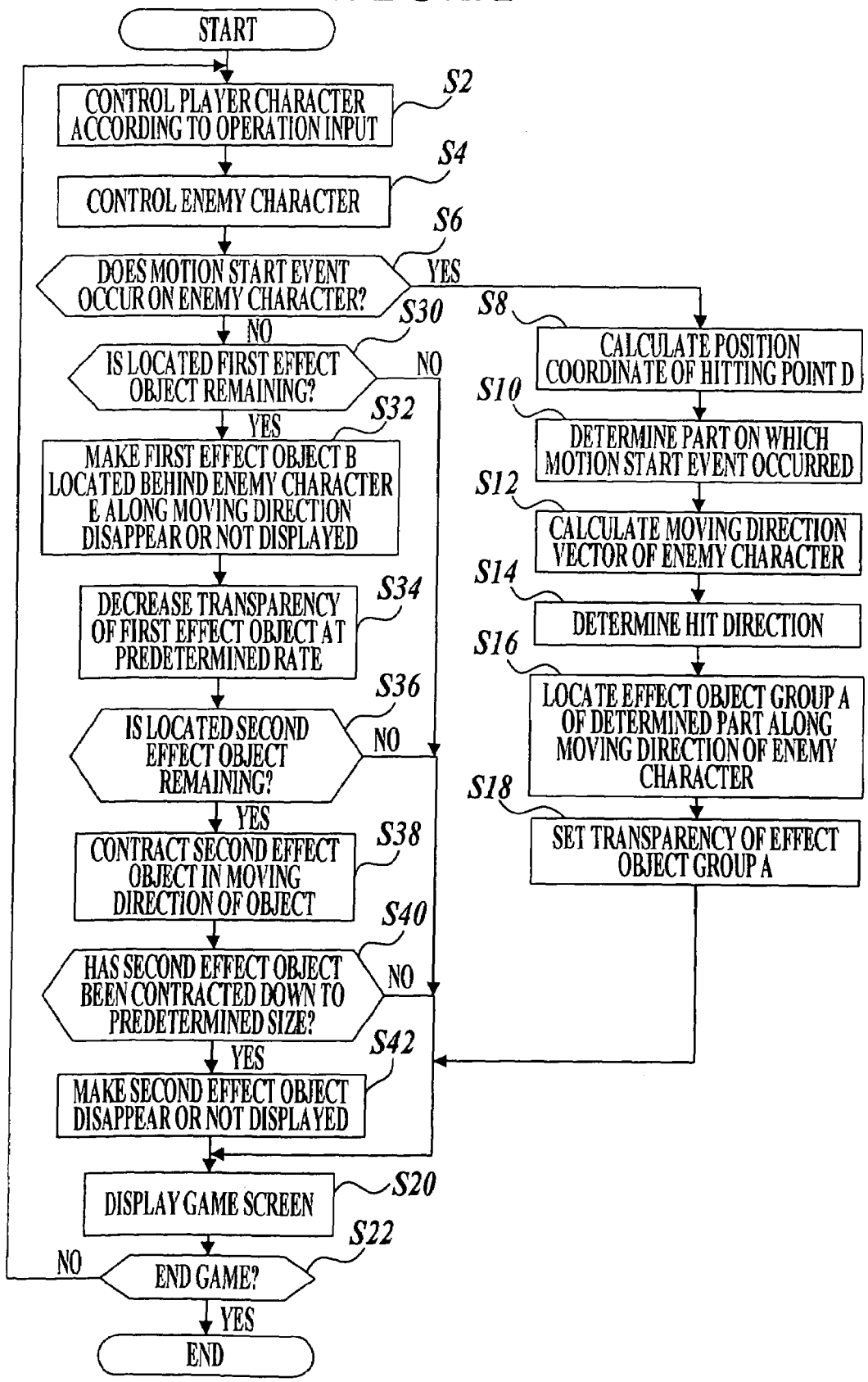
FIG. 11 is a flowchart illustrating a process flow of a visual effect display.

FIG. 11 is a flowchart illustrating a process flow of the visual effect display in the present embodiment. The processing unit 20 implements the visual effect display process by loading and performing the event judgment program 720, the part determination program 722, the vector calculation program 724, and the effect control program 726. As a process in advance, it is assumed that a game space is set in the virtual space and the game has been started.

As shown in FIG. 11, the game calculation unit 22 controls the player character P according to the operation inputs from the player (step S2). For example, if the player has inputted a start of the kick and a direction of the kick, the player character P object is controlled so as to make the player character P object kick upward in the inputted direction according to predetermined motion data stored in the character information 738.

Next, the enemy character E is controlled (step S4). The enemy character E, for example, is controlled according to a predetermined thinking routine so as to attack the player character P.

Here, the event judgment unit 220 judges whether or not a motion start event has occurred on the enemy character P (step S6). For example, if the enemy character E exists within a predetermined range from the kick and the kick direction of the player character P, and further the enemy character E has taken no avoidance action, and has been determined to have been hit by the kick, the event judgment unit 220 judges that a motion start event has occurred.

If the unit 220 judges that a motion start event has occurred on the enemy character E object (step S6: YES), the part determination unit 222 calculates a position coordinate of the hitting point D where the leg part of the player character P object has hit the enemy character E that has been judged to have been hit by the kick (step S8). Next, the event judgment unit 220 compares the position coordinate of the hitting point D with a predetermined condition, and determines on which part of any of the enemy character E head part, chest part or leg part has been-hit by the kick (step S10).

Next, the vector calculation unit 224 calculates the moving direction vector M showing in what direction the enemy character E is to be blown away by the kick (step S12). The part determination unit 222 determines the hit direction in which the enemy character E received the hit (step S14). For example, the part determination unit 222 compares a relative angle difference between the calculated moving direction vector M and the local coordinate of the enemy character E to determine the part.

Next, the effect control unit 226 loads the effect object information 740 based on the part determination information 734, and positions the effect object group A in the virtual space (step S16). Then, the effect control unit 226 sets the degree of transparency of the first effect objects B1 to B4 to be transparent as the kick leaves from the enemy character E, and sets the second effect objects C1 and C2 to be at a predetermined degree of transparency (step S18). Therefore, the first effect objects B1 to B4 therefore appear semitransparent, where the first effect objects B1 to B4 become more transparent as leaving further from the enemy character E. The second effect objects C1 and C2 appear semi-transparent in the same way.

When setting the position and degree of transparency of the effect object group A is completed, the image generation unit 24 generates one frame game image for the moment that the kick of the player character P hits the enemy character E and displays the frame game image on the image display unit 30 (step S20).

Next, the game calculation unit 22 judges whether or not the predetermined game end condition has been satisfied (step S22). If the game has not ended (step S22; No), the process advances to the next drawing frame, and the game calculation unit 22 controls the player character P according to inputs from the player (step S2) and controls the enemy character E (step S4).

Here, the event judgment unit 220 re-judges whether or not the kick of the player character P has hit any of the enemy characters E (step S6). If it is judged that no kick has hit any of the enemy characters E (step S6; NO), a judgment whether the located first effect object B is remaining is made (step 30).

If the located first effect object B is not remaining (step S30; NO), the image generation unit 24 generates an image signal of the game screen, and the image display unit 30 displays a game screen (step S20).

If the located first effect object B is remaining (step S30; YES), among the located first effect objects, ones located behind the corresponding enemy character E along the moving direction disappear or are not displayed (step S32). The degree of transparency of each of the remaining first effect objects B is decreased at a predetermined rate (step S34). The first effect objects B therefore become more visible as the enemy character E comes closer as if it were gradually being combined with the enemy character E object.

Next, the event judgment unit 220 judges whether there is located second effect objects C remaining (step S36). If there is no second effect object C remaining (step S36; NO), the image generation unit 24 generates images signals for the game screen, and the image display unit 30 displays the game screen (step S20).

On the other hand, if the located second effect object C is remaining (step S36; YES), the second effect object C is contracted (step S38). When it is contracted down to a predetermined size (step S40; YES), the second effect objects C disappears or are not displayed (step S42). Then, the image generation unit 24 generates images signals for the game screen, and the image display unit 30 displays the game screen (step S20).

By repeating the above processes, for example, as shown in FIG. 12 (for simplicity, a background and a player character P are not shown), when the enemy character E receives an upper kick by the player character P, the effect object group A forming the visual effect display are displayed toward the front in the movement direction (direction in which the enemy character E is blown away by the kick) of enemy character E at that moment. Then, the effect object group A disappears along with the passage of enemy character E so that it can no longer be seen on the successive game screens. The blow at the moment that the enemy character E receives the kick can be therefore expressed visually, and the game screen can provide an impression of forcefulness.

Figure 12A:
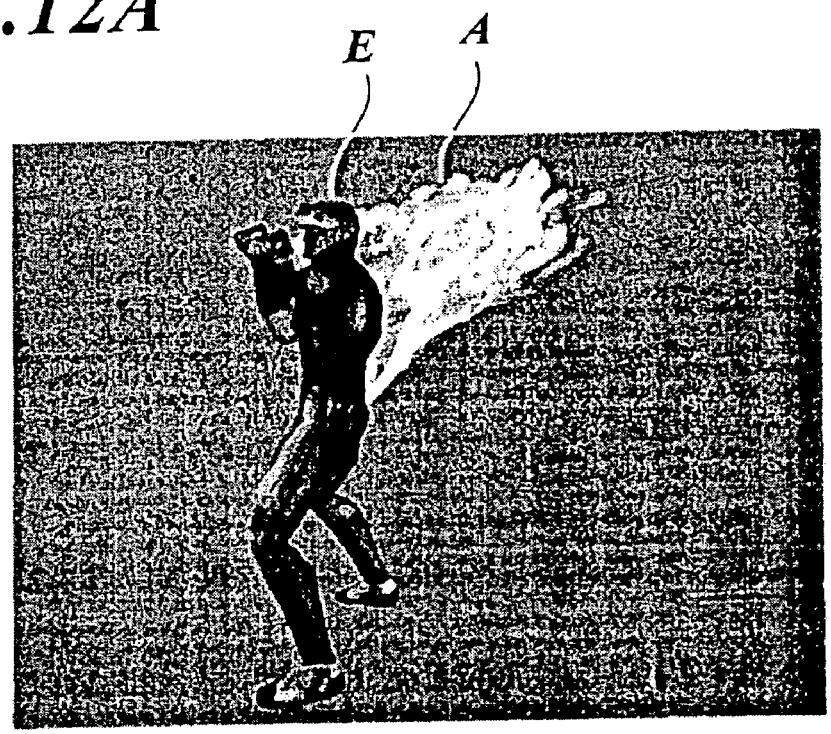
FIGS. 12A and 12B are views showing one example of a state where the visual effect display is displayed.
Figure 12B:
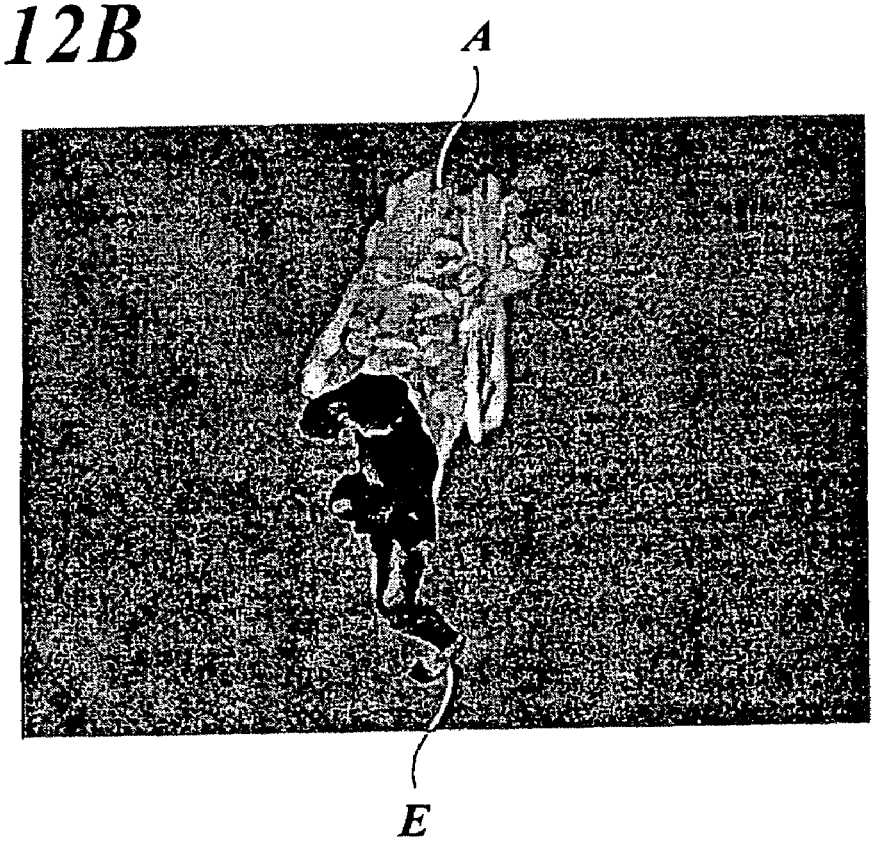

Although the virtual viewpoint positions are different between FIG. 12A and FIG. 12B, the first effect objects B1 to B4 and second effect objects C1 and C2 are positioned so as to intersect each other. By displaying these objects on the screen so as to overlap each other in a semitransparent state, the effect object group A appears to be one solid object from any viewed angle, regardless of a location of the virtual viewpoint.

[Hardware Structure]

Figure 13:
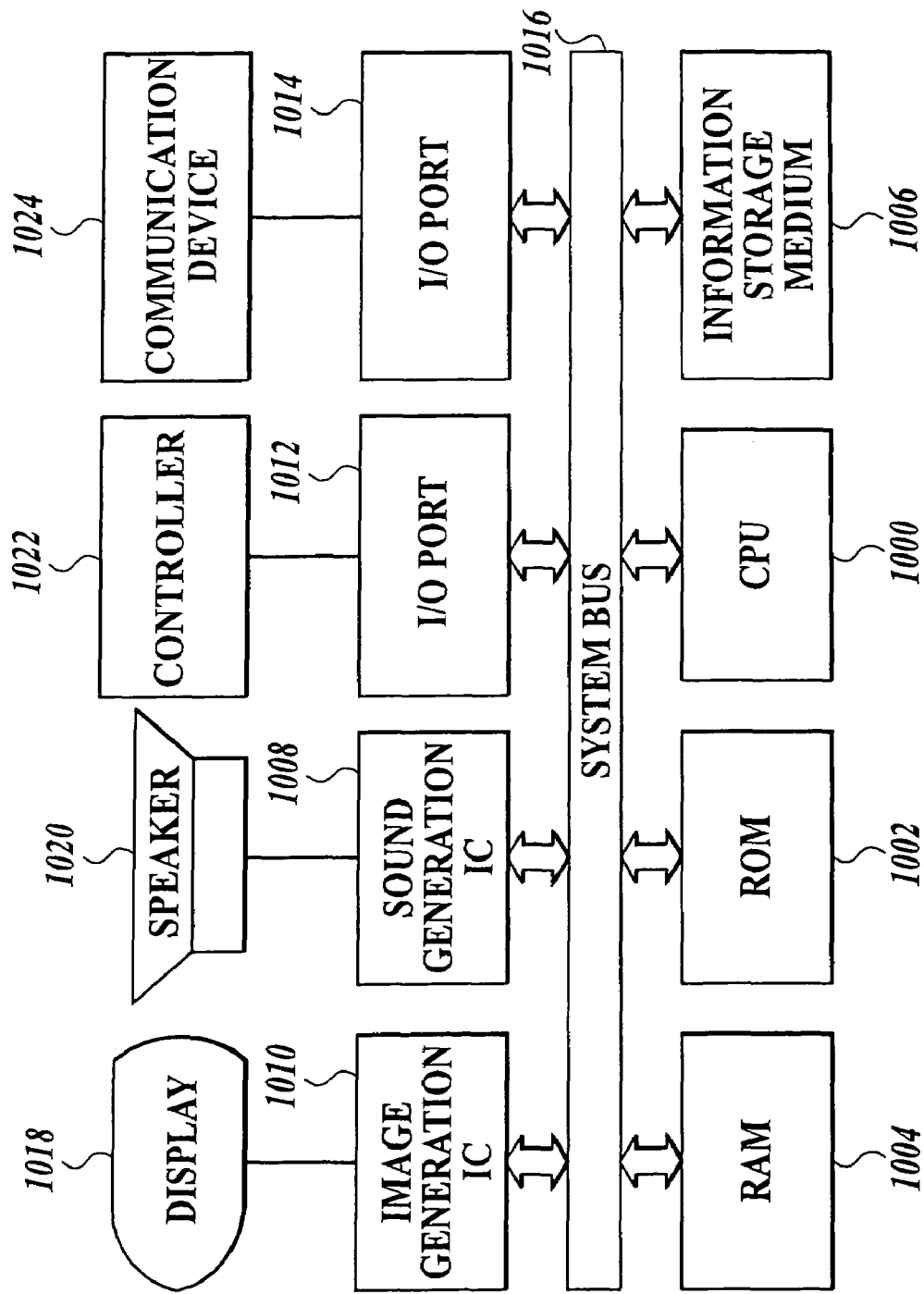
FIG. 13 is a view showing one example of a hardware structure for implementing the home game unit to which the present invention is applied.

Next, a structure of the hardware for implementing the home game unit 1200 will be described. FIG. 13 is a block diagram showing a hardware structure of the present embodiment. The home game unit 1200 comprises a CPU 1000, a ROM 1002, a RAM 1004, an information storage medium 1006, a sound generation IC 1008, an image generation IC 1010, and I/O ports 1012 and 1014, and connecting to a system bus 1016 enables each part to mutually input and output data.

The CPU 1000 corresponds to the processing device 20 in FIG. 8. The CPU 1000 performs various types of data processes and integrally controls all the devices according to system programs stored in the ROM 1002 and programs stored in the information storage medium 1006, and operation signals inputted from the control device 1022.

The ROM 1002 or RAM 1004 and the information storage medium 1006 correspond the storage unit 70 in FIG. 8. The ROM 1002 corresponds to the IC memory mounted in the main unit 1210 in FIG. 1, and stores data and programs such as system programs or the like associated with the control of the main unit 1210. The RAM 1004 is a storage means used as an operating area of the CPU 1000. A predetermined content of the information storage medium 1006 and the ROM 1002, or an operation result processed by the CPU 1000 are stored on the RAM 1004. The information storage medium 1006 corresponds to the memory card 1216, the IC memory 1214 and the CD-ROM 1212 in FIG. 1, and stores the game information 72 in FIG. 8. The information storage medium 1006 is implemented by an IC memory card, a detachable hard disk unit, an MO or the like, and stores information stored in the ROM 1002. Information in the information storage medium 1006 is loaded and used according to need.

The sound generation IC 1008 is an integrated circuit for generating game sounds such as effect sounds, BGM and the like based on information stored in the ROM 1002 and information storage medium 1006. The sound generated by the sound generation IC 1008 is outputted from the speaker 1020. The speaker 1020 corresponds to the sound output unit 40 in FIG. 8 and to the speaker 1222 in FIG. 1.

The image generation IC 1010 is an integrated circuit for generating pixel information to output an image to the display device 1018. The image generation IC 1010 corresponds to the image generation unit 24 in FIG. 8.

The display device 1018 corresponds to the image display unit 30 in FIG. 8, and to the display 220 in FIG. 1. The controller device 1022 is connected to the I/O port 1012, and the communication device 1024 is connected to the I/O port 1014.

The control device 1022 corresponds to the game controllers 1202 and 1204 in FIG. 1 and to the operation input unit 10 in FIG. 8. The control device 1022 allows the player to input for operating various types of games.

The communication device 1024 is a device for mediating various types of information used in the game device with an external unit. The communication device 1024 receives and transmits predetermined information according to the game program connected to another game device. The communication device 1024 is used for transmitting and receiving information such as game programs or the like through the communication line. The communication device 1024 corresponds to the communication unit 50 in FIG. 8, and to the communication device 1218 in FIG. 1.

Processes performed in the sound generation IC 1008 and in the image generation IC 1010 may be implemented by the CPU 1000, a general-purpose DSP or the like, through software.

The present invention can be applied not only to the home game unit 1200 as shown in FIG. 1, but also to various types of devices such as an arcade game device, a handheld game device, a large-sized attraction device where lots of players participate, or the like.

Figure 14:
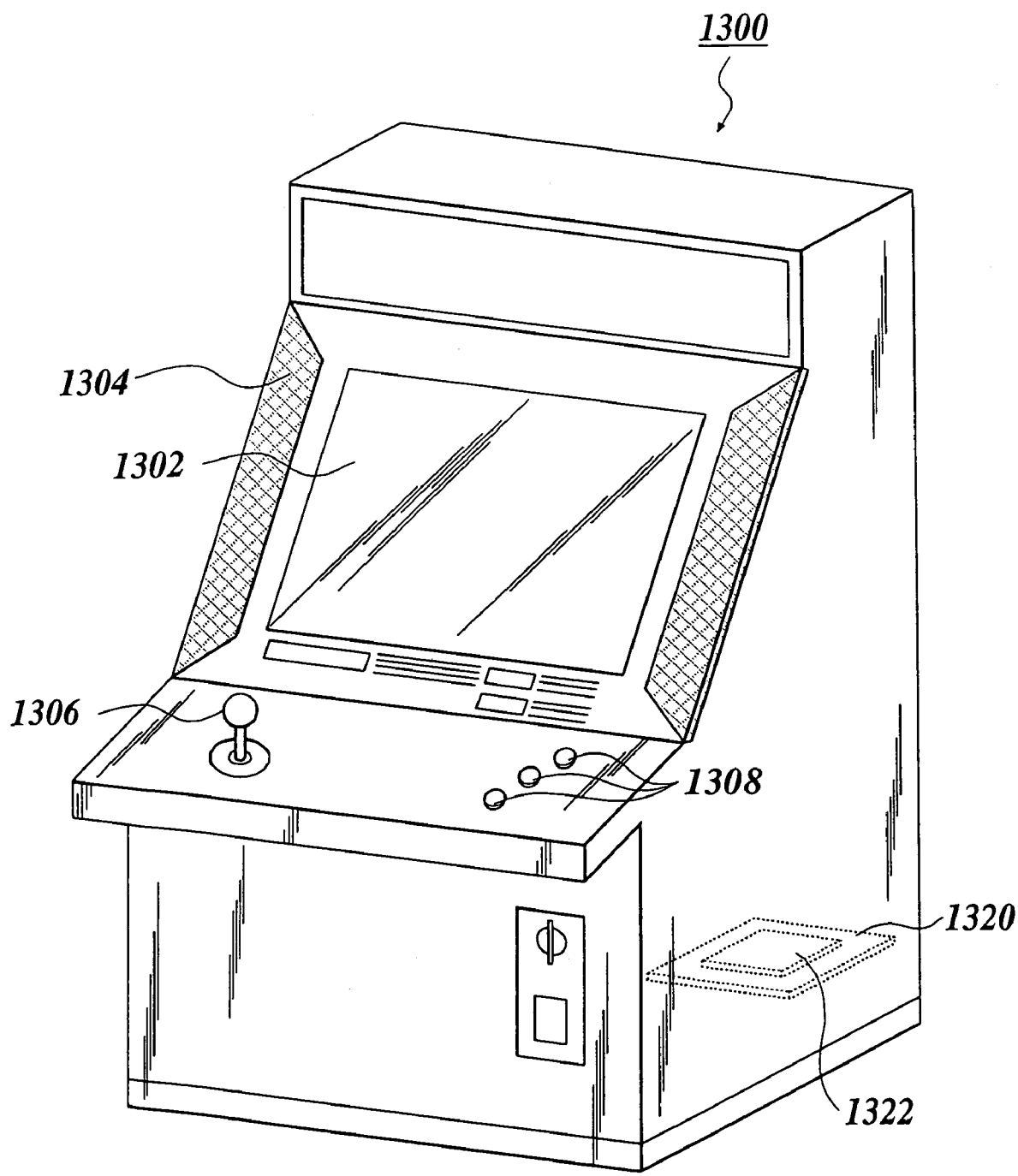
FIG. 14 is a view showing an appearance of an arcade game device to which the present invention is applied.

For example, FIG. 14 shows an external view of an arcade game device 1300 to which the present invention is applied. As shown in FIG. 14, the arcade game device 1300 comprises a display 1302 for displaying an image on the game screen, a speaker 1304 for outputting game sound effects and BGM, a joystick 1306 for inputting forward, back, left or right directions, a pushbutton 1308 and a control unit 1320 for integrally controlling the arcade game device with a calculation process to perform a predetermined game.

The control unit 1320 contains a computation device such as a CPU or the like, and a ROM 1322 storing programs and data required for controlling the arcade game device 1300 and for performing the game. The CPU provided in the control unit 1320 performs various types of processes by loading programs and data from the ROM 1322 according to necessity for computation.

The player operates the player character P by inputting with the joystick 1306 and the pushbutton 1308 while viewing the game screen displayed on the display 1302 to enjoy the game.

The present invention is not limited to the game performed inn a standalone device, and may be applied to a game called a network game. A system structure to implement a network game may, for example, be configured from a game terminal such as a personal computer placed in the house, a household game system and the like, connected to a server through a cable or wireless communication line, such as a dedicated cable network, Internet or the like; or may be configured to connect a plurality of game terminals each other through a communication line without having a server; or may be configured to connect a plurality of game terminals through a communication line with one of the game terminals functioning as a server; or may be a one unit system physically connecting a plurality of game terminals (for example, an arcade game system), and the like.

[Description of Alternative Example]

The embodiment of the present invention is described above. However, application of the present invention is not limited to the embodiment and therefore additions, deletions and changes may be made according to necessity to the components without departing from the scope and spirit of the present invention.

For example, in the above embodiment, the effect object group A is described as a plurality of plate-like objects. However, the effect object group A may comprise a plurality of simple models (objects) expressing an outer shape of the enemy character E. What are referred to here as simple models are models comprising a small number of polygons compared to a regular model expressing the outer shape of the enemy character E. In this case, the simple model may be modeled in advance as many as four frames from the next drawing frame after the enemy character E is kicked by the player character P, to show a state of the enemy character P, and positioned in a semi-transparent state along the moving direction vector M.

The texture for mapping the effect object is prepared in advance. However, appearance images T1 to T4 and appearance images U1 to U2 may be generated by rendering a front image and a side image of the enemy character E at each time that it is judged that a kick has hit the enemy character E. More specifically, a part within a range corresponding to the effect object to be pasted over may by cut out from the rendered image with masking to be used.

Also, a condition for displaying the visual effect is that the object (enemy character E) receives a blow from another object (player character P). However, a condition for displaying the visual effect may be occurrence of an event to start the movement of the object itself.

For example, FIGS. 15A, 15B, 15C and 15D show one alternative example of the visual display effect, in which a robot R launching an arm part with rocket propulsion is continuously shown. Here, as a matter of convenience, only the first effect objects B1 to B4 are shown.

Figure 15A:
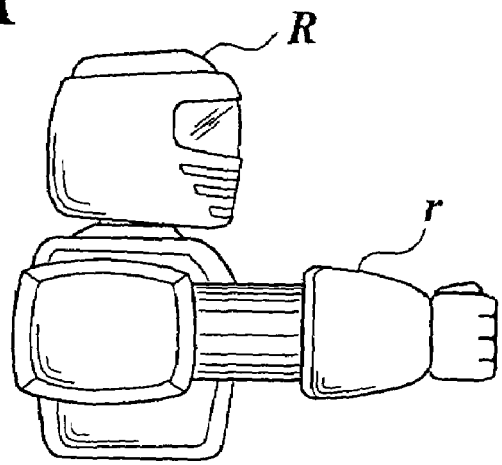
FIGS. 15A, 15B, 15C and 15D are views showing one example of alternatives of the visual display effect.
Figure 15B:
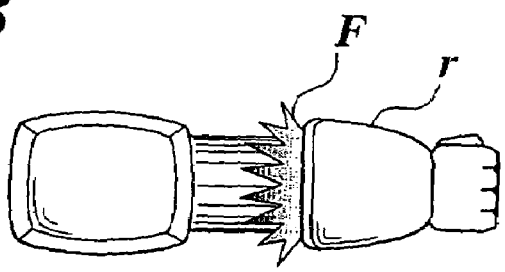
Figure 15C:
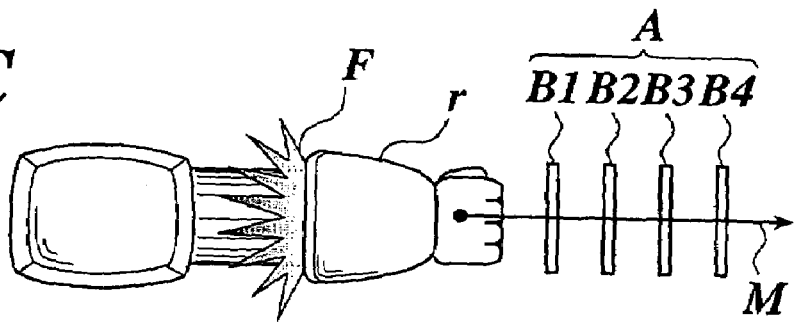
Figure 15D:
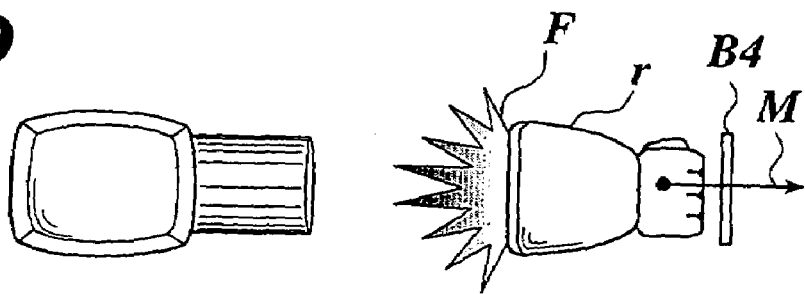

As shown in FIG. 15A, the arm part r does not receive a blow from another object, but a motion start event occurs according to a predetermined condition such as operation by a player, and thereby the arm part r starts the motion by being launched. In this case, as shown in FIG. 15B, the effect object group A are displayed in a direction to be launched (corresponding to moving direction vector M) at the same time with displaying a flame F of the launch. Then, as shown in FIG. 15C, the effect object group A sequentially disappears or is not displayed from the first effect object B1 as the arm part is launched and moves.

Figure 16A:
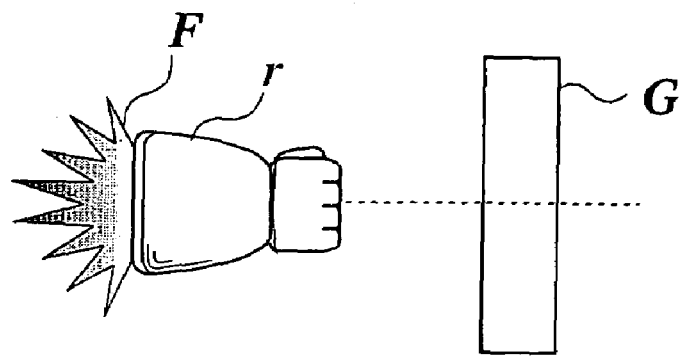
FIGS. 16A, 16B and 16C are views showing one example of alternatives of the visual display effect.
Figure 16B:
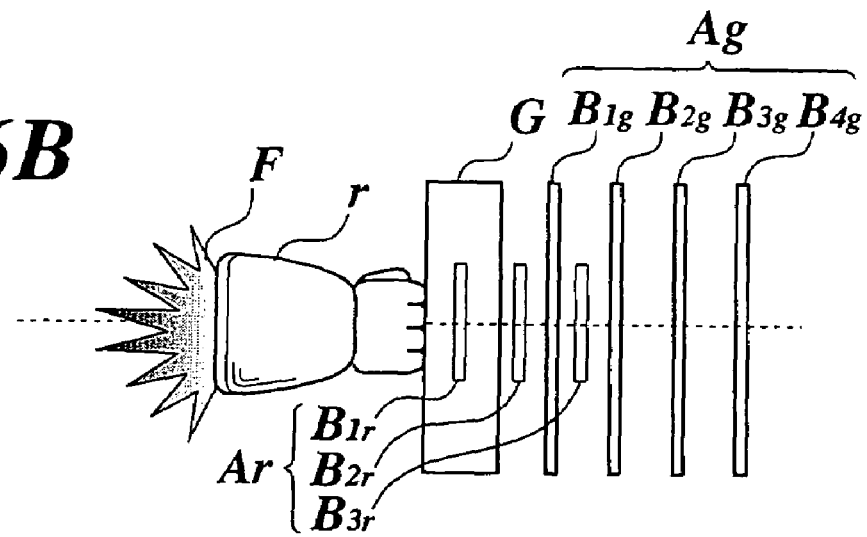

The object which is subject to the visual display effect is not limited to an object receiving an blow or a collision. For example, FIGS. 16A, 16B and 16B are views showing one alternative example of the visual display effect, and continuously show a state of a block G being hit by the arm part r launched from the robot. Here, as a matter of convenience, only the first effect objects B1 to B4 are shown.

Figure 16C:
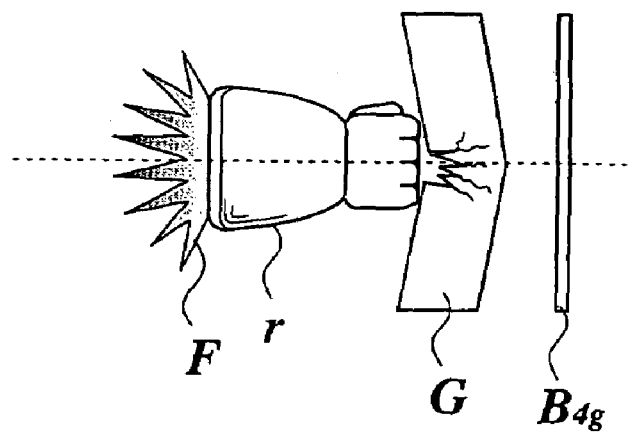

As shown in FIGS. 16A, 16B and 16C, at the moment that the flied arm part r hits the block G, the effect object groups Ag and Ar may be respectively displayed in regard to both the block G and the arm part r in order to express an impact at a side of receiving the hit as well as power at a side of destroying, simultaneously.

Further, positions for locating the effect object group A are set in advance. However, the effect control unit 226 may determine the positions. For example, the effect control unit 226 calculates the positions toward the front side of the moving direction vector M (direction to be blown away by a kick) of the enemy character E at a predetermined interval, with the hitting point D where the player character P's kick has hit as a start point. Alternatively, the effect control unit 226 determines the first effect objects B1 to B4 by calculating a posture of the enemy character at a frame which is predetermined number of frames ahead from the moment, and further calculates an angle of a position of a backside of the enemy character with the moving direction vector M. Then, based on the calculated angle at the position of the backside, the position for locating the effect object group A may be determined.

Further, according to displaying the effect object group A, it is not limited to changing the degree of transparency and, for example, it may be changing brightness of three primary colors brightness as color information. For example, if highly bright yellowish red is shown as a first display color and it is to be changed to dark-colored red, it is possible to provide the impression that flame is blown and then extinguished. In this case, the effect can be more effective by changing the brightness and the color of a circumferential part and an internal part of the effect object. Further, white may be set as a first display color and it may be changed to a standard display color (set color).

The entire disclosure of Japanese Patent Application No. Tokugan 2003-093193 filed on Mar. 31, 2003 including specification, claims, drawings and summary are incorporated herein by reference in its entirety.

What is claimed is:

1. A method for generating an image in a virtual space seen from a predetermined viewpoint in a game to be output on a display, comprising:

judging whether to start a motion of a first object placed in the virtual space in the game;

if it is judged to start the motion of the first object, automatically controlling the motion of the first object in a predetermined moving direction;

if it is judged to start the motion of the first object, displaying a plurality of effect objects at predetermined positional intervals at substantially the same time, the plurality of effect objects provided three-dimensionally at the side that the first object is going to move from a location of the first object immediately before the first object starts moving, each of the plurality of effect objects showing a respective future sequential motion of the first object;

making the plurality of effect objects sequentially disappear in proximate order from the location of the first object at a time in which it is judged to start the motion of the first object after the first object starts moving as the first object moves into the position corresponding the respective effect object; and displaying the first object and effect objects on the display, wherein locating the plurality of effect objects includes:

determining a plurality of locations where the first object is to pass with the motion of the first object controlled;

locating at each of the plurality of locations determined, an object showing a posture of the first object at a time in which the first object arrives at the each of the plurality of locations, as each of the plurality of effect objects, the plurality of effect objects being plate-like objects on which an image is mapped, the image being seen from a viewpoint different from the predetermined viewpoint, and the plurality of effect objects intersecting the moving direction by a predetermined angle.

2. The method as claimed in claim 1, wherein the making the plurality of effect objects sequentially disappear includes making the plurality of effect objects located at a rear side in the moving direction from the location of the first object, sequentially disappear according to the controlling the motion of the first object.

3. The method as claimed in claim 1, further comprising changing color information of the plurality of effect objects in accordance with the motion of the first object being controlled.

4. The method as claimed in claim 3, wherein the changing the color information includes changing the color information so as to decrease a transparency degree as a distance between the location of the first object and each of the plurality of effect objects becomes shorter.

5. The method as claimed in claim 1, wherein
the first object comprises a plurality of action-receiving parts;
a plurality of pieces of effect object information is provided to each of the plurality of action-receiving parts,
the judging whether to start the motion of the first object includes judging to start the motion of the first object if any one of the plurality of action-receiving parts satisfies a predetermined action-receiving condition; and
the locating the plurality of effect objects includes locating the plurality of effect objects based on the plurality of pieces of effect object information corresponding to the action-receiving part that is judged to satisfy the action-receiving condition.

6. An information storage medium having information recorded thereon, when the information is loaded onto an operating apparatus, the information making the operating apparatus execute the method as claimed in claim 1.

7. An image generation device for generating an image in a virtual space seen from a predetermined viewpoint in a game to be output on a display, comprising:
a memory that stores a computer executable program;
a processor that, when the program is executed, functions as:
a judging section for judging whether to start a motion of a first object placed in the virtual space in the game;
a motion control section for, if it is judged to start the motion of the first object, automatically controlling the motion of the first object in a predetermined moving direction;
a display control section for, if it is judged to start the motion of the first object, controlling to display a plurality of effect objects at predetermined positional intervals at substantially the same time, the plurality of effect objects being provided three-dimensionally at the side that the first object is going to move from a location of the first object immediately before the first object starts moving, each of the plurality of effect objects showing a respective future sequential motion of the first object;
a nondisplay control section for controlling to make the plurality of effect objects sequentially disappear in proximate order from the location of the first object at a time in which it is judged to start the motion of the first object after the first object starts moving as the first object moves into the position corresponding the respective effect object,
wherein the display control section:
determines a plurality of locations where the first object is to pass with the motion of the first object controlled;
locates at each of the plurality of locations determined, an object showing a posture of the first object at a time in which the first object arrives at the each of the plurality of locations, as each of the plurality of effect objects, the plurality of effect objects being plate-like objects on which an image is mapped, the image being seen from a viewpoint different from the predetermined viewpoint, and the plurality of effect objects intersecting the moving direction by a predetermined angle.

8. A program stored in a computer readable storage medium, when the program is loaded onto an operating device, the program generating an image in a virtual space by making the operating device execute the method as claimed in claim 1.

9. The method as claimed in claim 1, wherein the first object is an attacked object and the plurality of effect objects are displayed behind the attacked object.

10. The image generation device as claimed in claim 7, wherein the first object is an attacked object and the plurality of effect objects are displayed behind the attacked object.

* * * * *